(12) United States Patent
Borkovic

(10) Patent No.: US 11,221,979 B1
(45) Date of Patent: Jan. 11, 2022

(54) SYNCHRONIZATION OF DMA TRANSFERS FOR LARGE NUMBER OF QUEUES

(71) Applicant: Amazon Technologies, Inc., Seattle, WA (US)

(72) Inventor: Drazen Borkovic, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/247,016

(22) Filed: Nov. 24, 2020

(51) Int. Cl.
  *G06F 13/28* (2006.01)
  *G06N 3/063* (2006.01)
  *G06F 9/52* (2006.01)
  *G06F 13/37* (2006.01)

(52) U.S. Cl.
  CPC .......... *G06F 13/28* (2013.01); *G06F 9/52* (2013.01); *G06F 13/37* (2013.01); *G06N 3/063* (2013.01)

(58) Field of Classification Search
  CPC ..................................................... G06F 13/28
  USPC ................................................. 710/22
  See application file for complete search history.

(56) References Cited

U.S. PATENT DOCUMENTS

| | | | | | |
|---|---|---|---|---|---|
| 4,725,946 | A | * | 2/1988 | Prange | G06F 9/52 710/200 |
| 5,590,378 | A | * | 12/1996 | Thayer | G06F 13/28 710/30 |
| 6,055,583 | A | * | 4/2000 | Robbins | G06F 13/28 710/22 |
| 6,725,457 | B1 | * | 4/2004 | Priem | G06F 9/52 709/226 |
| 2002/0010814 | A1 | * | 1/2002 | Barry | G06F 13/28 710/22 |

OTHER PUBLICATIONS

U.S. Appl. No. 17/247,180, filed Dec. 2, 2020, Drazen Borkovic.

* cited by examiner

*Primary Examiner* — Titus Wong
(74) *Attorney, Agent, or Firm* — Weaver Austin Villeneuve & Sampson LLP

(57) ABSTRACT

Synchronization of a plurality of aggregate DMA transfers on large number of DMA queues can be achieved using a small number of semaphores. One or more semaphores from M semaphores can be assigned to each aggregate DMA transfer based on round-robin or another suitable method. Each aggregate DMA transfer can comprise N DMA transfers, where M is smaller than N. Each DMA transfer can be assigned to one of the assigned one or more semaphores from the M semaphores. Each DMA engine of N DMA engines can increment the assigned semaphore after performing a respective DMA transfer of the N DMA transfers. A computational engine waiting on completion of a certain aggregate DMA transfer can perform an operation based upon the one or more assigned semaphores reaching respective threshold values.

20 Claims, 10 Drawing Sheets

| TRIGGER OPERATION 502 | | S1 504 | S2 506 | S3 508 |
|---|---|---|---|---|
| TRIG1 (Q1,S1;Q2,S1;Q3,S1;Q4,S1;Q5,S1;Q6,S1;Q7,S1;Q8,S1;Q9,S1;Q10,S1;Q11,S1;Q12,S1;Q13,S1;Q14,S1;Q15,S1;Q16,S1) | 502_1 | 16 | 0 | 0 |
| TRIG2 (Q1,S2;Q2,S2;Q3,S2;Q4,S2;Q5,S2;Q6,S2;Q7,S2;Q8,S2;Q9,S2;Q10,S2;Q11,S2;Q12,S2;Q13,S2;Q14,S2;Q15,S2;Q16,S2) | 502_2 | 16 | 16 | 0 |
| TRIG3 (Q1,S3;Q2,S3;Q3,S3;Q4,S3;Q5,S3;Q6,S3;Q7,S3;Q8,S3;Q9,S3;Q10,S3;Q11,S3;Q12,S3;Q13,S3;Q14,S3;Q15,S3;Q16,S3) | 502_3 | 16 | 16 | 16 |
| TRIG4 (Q1,S1;Q2,S1;Q3,S1;Q4,S1;Q5,S1;Q6,S1;Q7,S1;Q8,S1;Q9,S1;Q10,S1;Q11,S1;Q12,S1;Q13,S1;Q14,S1;Q15,S1;Q16,S1) | 502_4 | 32 | 16 | 16 |
| TRIG5 (Q1,S2;Q2,S2;Q3,S2;Q4,S2;Q5,S2;Q6,S2;Q7,S2;Q8,S2;Q9,S2;Q10,S2;Q11,S2;Q12,S2;Q13,S2;Q14,S2;Q15,S2;Q16,S2) | 502_5 | 32 | 32 | 16 |
| TRIG6 (Q1,S3;Q2,S3;Q3,S3;Q4,S3;Q5,S3;Q6,S3;Q7,S3;Q8,S3;Q9,S3;Q10,S3;Q11,S3;Q12,S3;Q13,S3;Q14,S3;Q15,S3;Q16,S3) | 502_6 | 32 | 32 | 32 |

| Trigger Operation 602 | | S1 504 | S2 506 | S3 508 |
|---|---|---|---|---|
| Trig1 (Q1,S1;Q2,S1;Q3,S1;Q4,S1;Q5,S1;Q6,S1;Q7,S1;Q8,S1;Q9,S1;Q10,S2;Q11,S2;Q12,S2;Q13,S2;Q14,S2;Q15,S2;Q16,S2) | 602_1 | 10 | 6 | 0 |
| Trig2 (Q1,S1;Q2,S1;Q3,S1;Q4,S1;Q5,S1;Q6,S1;Q7,S1;Q8,S1;Q9,S1;Q10,S1;Q11,S3;Q12,S3;Q13,S3;Q14,S3;Q15,S3;Q16,S3) | 602_2 | 20 | 6 | 6 |
| Trig3 (Q1,S1;Q2,S1;Q3,S1;Q4,S1;Q5,S1;Q6,S1;Q7,S1;Q8,S1;Q9,S1;Q10,S1;Q11,S2;Q12,S2;Q13,S2;Q14,S2;Q15,S2;Q16,S2) | 602_3 | 30 | 12 | 6 |
| Trig4 (Q1,S1;Q2,S1;Q3,S1;Q4,S1;Q5,S1;Q6,S1;Q7,S1;Q8,S1;Q9,S1;Q10,S1;Q11,S3;Q12,S3;Q13,S3;Q14,S3;Q15,S3;Q16,S3) | 602_4 | 40 | 12 | 12 |
| Trig5 (Q1,S1;Q2,S1;Q3,S1;Q4,S1;Q5,S1;Q6,S1;Q7,S1;Q8,S1;Q9,S1;Q10,S1;Q11,S2;Q12,S2;Q13,S2;Q14,S2;Q15,S2;Q16,S2) | 602_5 | 50 | 18 | 12 |
| Trig6 (Q1,S1;Q2,S1;Q3,S1;Q4,S1;Q5,S1;Q6,S1;Q7,S1;Q8,S1;Q9,S1;Q10,S1;Q11,S3;Q12,S3;Q13,S3;Q14,S3;Q15,S3;Q16,S3) | 602_6 | 60 | 18 | 18 |

FIG. 6

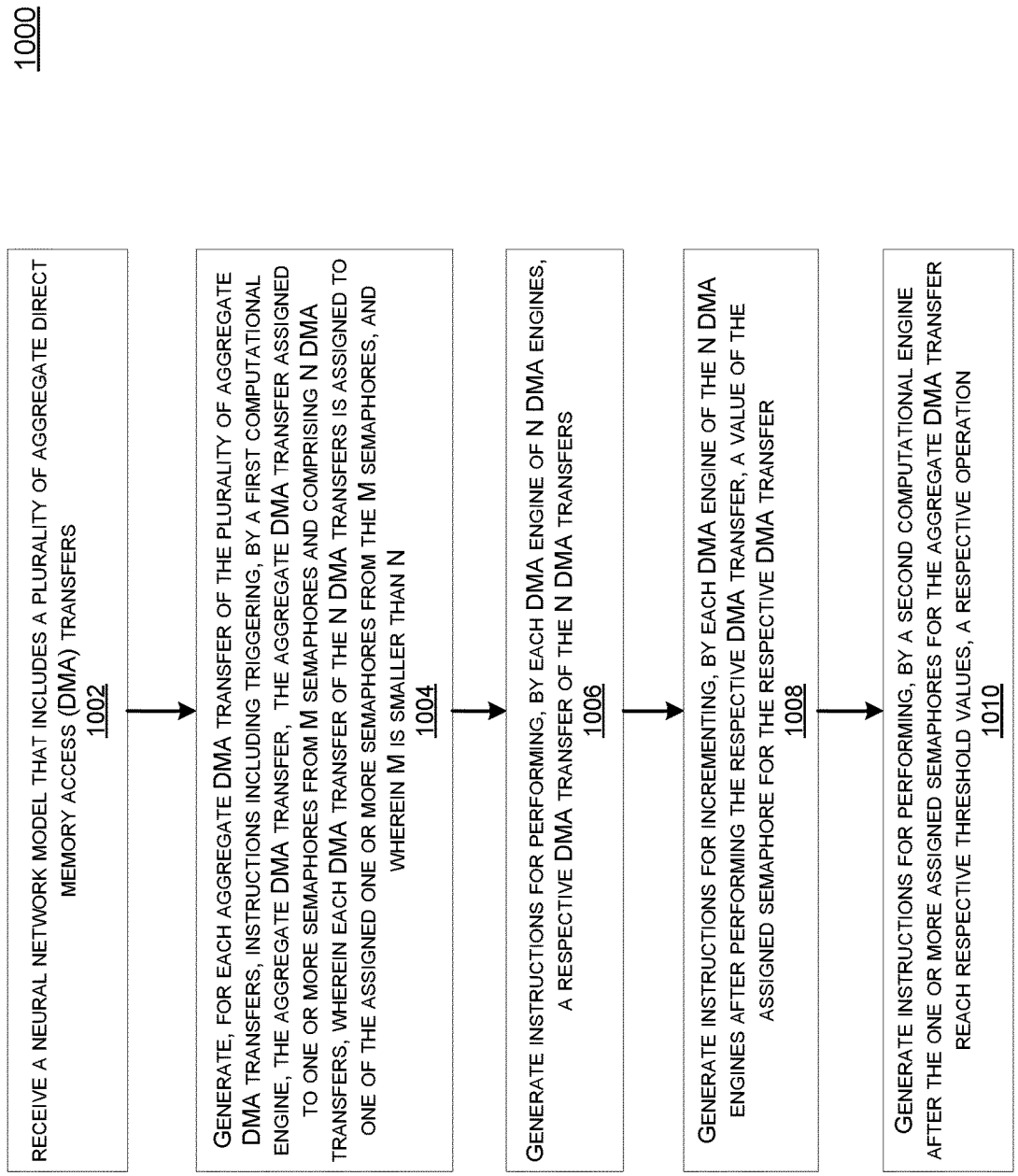

US 11,221,979 B1

SYNCHRONIZATION OF DMA TRANSFERS FOR LARGE NUMBER OF QUEUES

BACKGROUND

In computer systems, multiple agents may execute concurrently to perform different operations. An agent can be an integrated circuit that can perform certain operations sequentially based on the system architecture. Generally, multiple agents can execute autonomously in parallel but periodically they may need to synchronize certain operations. As an example, in a neural network processor, multiple agents may include various computational engines and direct memory access (DMA) engines executing in parallel to perform different operations. The computational engines can be used to perform different neural network computations such as pooling, activation, convolution, among other operations. In most instances, an agent may consume data produced by another agent, or an agent may need to use memory space currently reserved for another agent. Semaphores may be used to provide synchronization when multiple agents need to access a shared resource. A hardware semaphore may provide a simpler and more cost-effective solution for synchronization than certain software primitives.

BRIEF DESCRIPTION OF THE DRAWINGS

Various embodiments in accordance with the present disclosure will be described with reference to the drawings, in which:

FIG. 5 shows a table with example values of semaphores S1, S2, and S3 for a plurality of aggregate DMA transfers with one semaphore assigned to each aggregate DMA transfer, according to certain embodiments;

FIG. 6 shows a table with example values of the semaphores S1, S2, and S3 for a plurality of aggregate DMA transfers with two semaphores assigned to each aggregate DMA transfer, according to certain embodiments;

FIG. 10 includes a flowchart illustrating a method, which can be used to perform synchronization of DMA transfers on large number of DMA queues with a smaller number of semaphores, according to certain embodiments.

DETAILED DESCRIPTION

Figure 1:
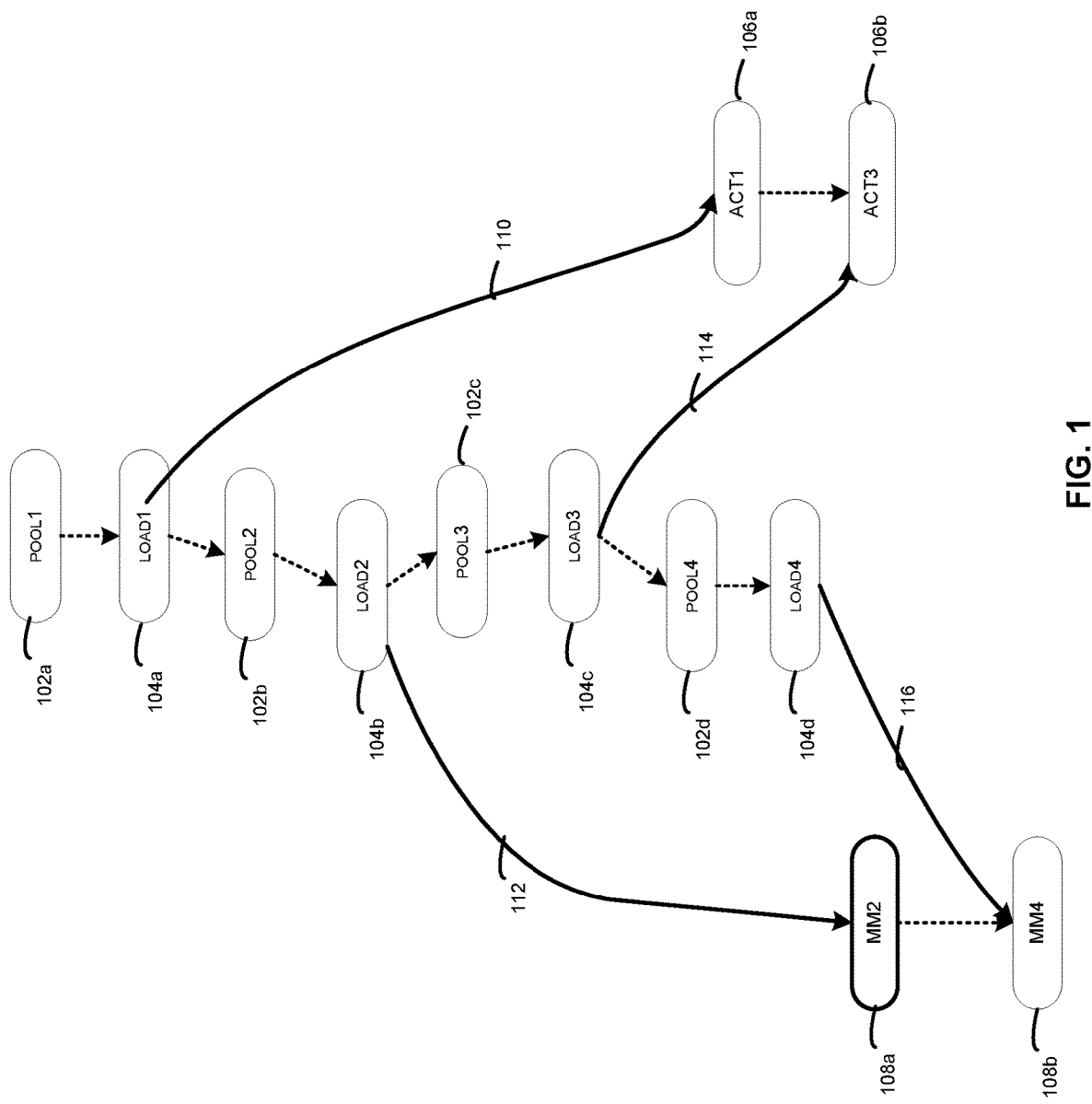
FIG. 1 illustrates an example neural network graph which can be used to describe certain embodiments.

An artificial neural network (also called a neural network) is generally a set of algorithms modeled loosely after the human brain, which can be used to recognize underlying relationships or patterns in an input dataset through a process that mimics the way a human brain operates. Neural networks can be trained to learn about how to perform a certain computing task such as image recognition, speech recognition, computer vision, text processing, search queries, among others. A neural network can be represented using a neural network graph comprising different types of operations to be performed on the input dataset. Each operation may be represented by a node in the graph and the result of one operation can feed another node thus forming a hierarchical tree. As an example, for a convolutional neural network (CNN) the operations may include convolution, pooling, activation, and normalization.

The neural network graph can be used to generate a neural network model, which can be compiled using a compiler to generate machine level instructions that can be executed by different components of a neural network processor. Each operation of the neural network graph can be expanded into one or more instructions. For example, the convolution operation may be expanded into multiple matrix multiplication (MM) instructions. In this specification, the terms "operation" and "instruction" can be used interchangeably. The neural network processor may include a pooling engine, an activation engine, a processing engine (PE) array, and a DMA engine, which may execute their respective instructions to perform pooling operations, activation operations, MM operations, and DMA operations, respectively. The DMA engine can be used to perform DMA operations to transfer data for different computational engines using a queue. For example, a DMA transfer may be used to load data from a host memory for consumption by the PE array, or to store data computed by the activation engine to the host memory.

Semaphores can be used to perform synchronization between DMA transfers on the DMA engine and the computational engines. A semaphore can be a register with 8 bits, 16 bits, 32 bits or another suitable size. In certain implementations, one semaphore can be assigned per DMA queue. As an example, a pooling engine can trigger one or more DMA transfers on the DMA queue using the DMA engine. The DMA engine may perform the DMA transfers and increment the semaphore value after completion of each DMA transfer. The activation engine may wait for the semaphore to reach a threshold value before performing an activation operation. For example, the semaphore reaching a threshold value may imply that the semaphore has been incremented to a specific value after completion of a first DMA transfer. The activation engine may exit the wait state to perform the activation operation using a portion of the data from the completed DMA transfer. Similarly, a PE array may be dependent on a second DMA transfer and wait on another value of the semaphore indicating completion of the second DMA transfer before performing an MM operation. Thus, the DMA engine can perform consecutive DMA transfers and increment the semaphore value after completing each DMA transfer to indicate to the computing engines, which are waiting on respective values of the semaphore, completion of the respective DMA transfer.

The above method can be used to perform synchronization of DMA transfers using a single semaphore per DMA queue. In certain examples, a single DMA queue may not be enough to transfer large amounts of data and parallel transfers on multiple queues may be required. For example, training neural network accelerators may require large amounts of data to be transferred between multiple accelerators since each accelerator may calculate a subset of weight updates and all updates may be broadcast to the accelerators. However, the number of semaphores that are needed may be same as the number of DMA queues, which may not be cost-effective for systems with a large number of DMA queues. For example, certain systems may support 100 or more DMA queues, but having the same number of semaphores may require that many hardware registers. Large numbers of hardware registers can increase the chip area as well as complexity in management of the semaphores, which can ultimately impact the system performance.

As an example, a first computational engine may trigger a plurality of aggregate DMA transfers sequentially on N DMA engines. Each aggregate DMA transfer may include N DMA transfers, where each DMA transfer may be assigned to a semaphore from N semaphores, respectively. Each DMA engine may perform a respective DMA transfer and increment the assigned semaphore after performing the respective DMA transfer. For example, each of the N semaphores may have an initial value of 0. After the first aggregate transfer is finished, each semaphore may be incremented to a value 1. A second computational engine waiting for the first DMA transfer to finish may wait for each of the N semaphores to reach the value of 1 before performing an operation.

For N equal to 16, each aggregate DMA transfer may include 16 DMA transfers with each DMA transfer assigned to one of the 16 semaphores, respectively. The second computational engine may have to wait on each of the 16 semaphores concurrently to reach the value of 1 before performing an operation. Execution of a wait instruction may involve performing a comparison operation, and therefore can be slow. Thus, the wait instructions can affect the performance of the system which may get worse as the number of wait instructions increases for higher numbers of semaphores. Therefore, it is desirable to use a smaller number of semaphores for synchronization of DMA transfers on large number of DMA queues.

Certain embodiments can be used for synchronization of DMA transfers on a large number of DMA queues with a significantly smaller number of semaphores as compared to the number of DMA queues. For example, M semaphores can be used for synchronization of N DMA transfers on N DMA queues where M is smaller than N. The instructions to perform the DMA synchronization can be generated by the compiler and can be executed by different engines of a neural network processor. In certain embodiments, a plurality of aggregate DMA transfers may be triggered sequentially by a first computational engine on N DMA engines. Each aggregate DMA transfer can be assigned to one or more semaphores from the M semaphores by the compiler. Each aggregate DMA transfer can include N DMA transfers, and each DMA transfer of the N DMA transfers can be assigned to one of the assigned one or more semaphores.

As an example, M can be 3 and N can be 16. In certain examples, each aggregate DMA transfer may include 16 DMA transfers assigned to one of the 3 semaphores in a round robin manner. For example, a first aggregate DMA transfer may be assigned to a first semaphore, a second aggregate DMA transfer may be assigned to a second semaphore, a third aggregate DMA transfer may be assigned to a third semaphore, and a fourth aggregate DMA transfer may be assigned to the first semaphore, and so on. Each of the 16 DMA engines may perform a respective DMA transfer and increment the value of the assigned semaphore after performing the respective DMA transfer. For example, each of the semaphores may have an initial value of 0, and the 16 DMA engines may collectively increment the first semaphore value to 16 after performing the first aggregate DMA transfer, the second semaphore value to 16 after performing the second aggregate DMA transfer, the third semaphore value to 16 after performing the third aggregate DMA transfer, and the first semaphore value to 32 after performing the fourth aggregate DMA transfer.

A second computational engine may be waiting for completion of the first aggregate DMA transfer to use a portion of the data from the first aggregate DMA transfer for performing an operation. In certain embodiments, before performing the operation, the second computational engine may wait for the first semaphore to reach a threshold value which may indicate completion of the first aggregate DMA transfer. For example, the second computational engine may wait for the first semaphore value to be greater than or equal to 16 before performing a first operation, and wait for the third semaphore value to be greater than or equal to 16 before performing a second operation. Similarly, a third computational engine may wait for the second semaphore value to be greater than or equal to 16 before performing a third operation. Thus, certain embodiments can enable the waiting engines to wait on a single semaphore for N DMA transfers as compared to the N semaphores discussed previously. Therefore, using a smaller number of semaphores can improve the system performance by reducing the number of concurrent wait instructions for execution by the waiting engines, as well as reduce the chip area.

In certain embodiments, after triggering the third aggregate DMA transfer, the first computational engine may wait for the first semaphore value to be greater than or equal to 16 before it can re-assign the first semaphore to the fourth aggregate DMA transfer to ensure that each DMA transfer of the first aggregate DMA transfer has completed. Similarly, after triggering the fourth aggregate DMA transfer, the first computational engine may wait for the second semaphore value to be greater than or equal to 16 before it can re-assign the second semaphore to a fifth aggregate DMA transfer. Thus, the 3 semaphores can be assigned in a round-robin manner for each aggregate DMA transfer.

In certain examples, assigning the semaphores in the round-robin manner can provide an optimal usage of the semaphores when the DMA transfers are almost equal in size and are uniformly distributed in time. However, when the size of the DMA transfers or their time distribution is not uniform, the compiler can estimate the start and end times for each DMA transfer based on the memory bandwidth and the size of various buffers, and/or the computational capacity of different components of the neural network processor, and can alternate the semaphores in a different manner. For example, in certain embodiments, the compiler can assign the first semaphore to 10 DMA queues for the long DMA transfers, and assign the second semaphore and the third semaphore in an alternating manner to 6 DMA queues for the short DMA transfers. The waiting engines can wait on respective threshold values for the first semaphore and the second semaphore, or the first semaphore and the third semaphore before performing an operation, which can still provide better performance than waiting on 16 semaphores. Different other configurations of the assignment of the M semaphores to the N DMA transfers are also possible without deviating from the scope of the disclosure.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example neural network graph 100 which can be used to describe certain embodiments. The neural network graph 100 can be part of a larger neural network graph for a neural network. The neural network graph 100 may include different types of operations that can be performed given an input dataset. Each operation may be represented by a node in the neural network graph 100 and can be executed by an engine in a neural network processor. The input dataset may correspond to an image, text, audio, video or another type of data. As an example, the operations may include convolution, pooling, activation, normalization, load, or store. The edges in the neural network graph 100 may represent dependencies between the operations and may require synchronization since the output data of one node may be used as an input data to the next node.

The neural network graph 100 can be used to generate a neural network model, which can be compiled by a host system using a compiler to generate compiled code. The compiled code may include machine level instructions that can be executed by different components of a neural network processor, e.g., a pooling engine, an activation engine, a processing engine (PE) array, and a DMA engine. As an example, operations 102a-102d and 104a-104d may be performed by the pooling engine, operations 106a-106b may be performed by the activation engine, and operations 108a-108b may be performed by the PE array. Note that the neural network graph 100 may include additional or different nodes for other operations which are not shown here for the purposes of simplicity.

The pooling engine may perform pooling operations POOL1 102a, POOL2 102b, POOL3 102c, and POOL4 102d sequentially. The pooling operations can be used to perform mean, average, or maximum pooling to reduce the spatial dimensions of a given dataset. Output data computed from each pooling operation can be consumed by the activation engine or the PE array using DMA transfers. For example, each load operation LOAD1 104a, LOAD2 104b, LOAD3 104c, or LOAD4 104d can trigger a DMA engine to perform a DMA transfer using a queue. The load operations 104a-104d may be used to load data from memory to be used by other engines for neural network computations. Note that the pooling engine may perform other operations before, after or in-between the operations 102a-102d or 104a-104d.

The activation engine may wait for a specific DMA transfer to finish before performing certain operations. As shown by an edge 110 in FIG. 1, the activation engine may wait for the DMA transfer triggered by the LOAD1 operation 104a to finish before performing an ACT1 operation 106a. Similarly, as shown by an edge 114, the activation engine may wait for the DMA transfer triggered by the LOAD3 operation 104c to finish before performing an ACT3 operation 106b. The activation operations 106a-106b may be performed by the activation engine for non-linear transformation of the input data. Note that the activation engine may perform other operations before, after or in-between the operations 106a-106b.

Similarly, the PE array may wait for a specific DMA transfer to finish before executing certain instructions. For example, as shown by an edge 112, the PE array may wait for the DMA transfer triggered by the LOAD2 operation 104b to finish before performing an MM2 operation 108a. Similarly, as shown by an edge 116, the PE array may wait for the DMA transfer triggered by the LOAD4 operation 104d to finish before performing an MM4 operation 108b. The MM operations 108a-108b may be performed by the PE array for convolution computations. Note that the PE array may perform other operations before, after or in-between the operations 108a-108b.

Synchronization between various engines executing different operations may be needed because of their inter-dependencies as shown by the edges 110, 112, 114, and 116 in the neural network graph 100. A semaphore may be used to synchronize the DMA transfers among different engines so that the PE array or the activation engine does not execute an instruction until a specific DMA transfer is finished. For example, the PE array or the activation engine may need to execute an operation on some data which may only be available upon completion of a certain DMA transfer. In another example, an operation executed by the pooling engine may free up some memory space which may be used by the PE array to write its output. Use of the semaphore for synchronization is described with reference to FIG. 2.

Figure 2:
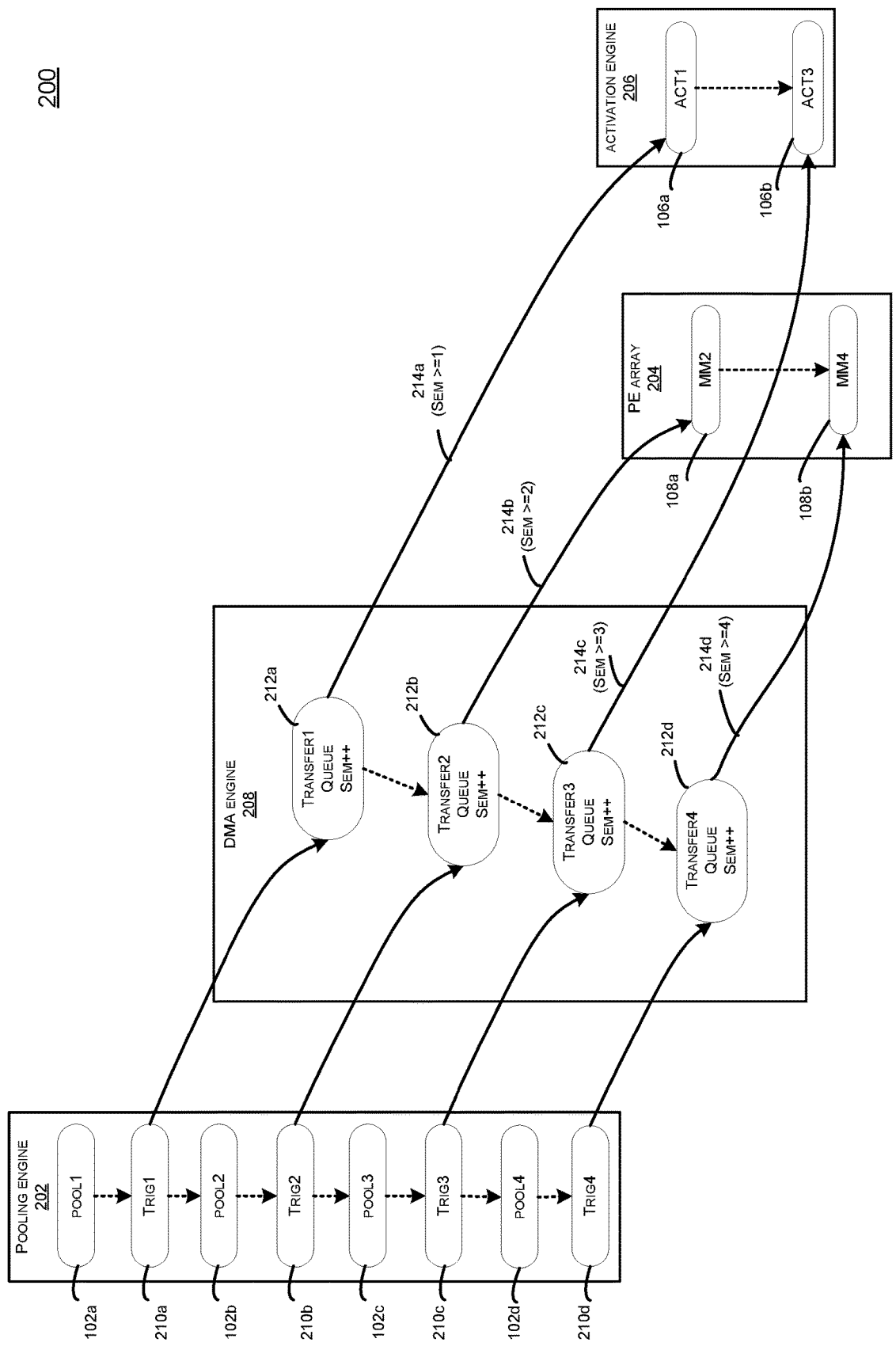
FIG. 2 illustrates an apparatus, which can be used to describe synchronization between different operations in the neural network graph using a semaphore.

FIG. 2 illustrates an apparatus 200, which can be used to describe synchronization between different operations in the neural network graph 100 using a semaphore. The apparatus 200 may include a pooling engine 202, a PE array 204, an activation engine 206 and a DMA engine 208. The apparatus 200 may be part of a neural network processor configured to execute neural network computations for training or inference operations associated with a neural network.

The pooling engine 202 may be configured to perform pooling operations 102a-102d as discussed with reference to FIG. 1. The LOAD operations 104a-104d discussed with reference to FIG. 1 can be represented using respective trigger operations 210a-210d in FIG. 2. For example, a TRIG1 operation 210a may trigger a first DMA transfer 212a using a queue in the DMA engine 208. Similarly, a TRIG2 operation 210b may trigger a second DMA transfer 212b, a TRIG3 operation 210c may trigger a third DMA transfer 212c, and a TRIG4 operation 210d may trigger a fourth DMA transfer 212d, using the same queue. Note that the pooling engine 202 may perform the operations 102a, 210a, 102b, 210b, 102c, 210c, 102d, and 210d sequentially, and therefore no synchronization may be needed between the operations performed by the pooling engine 202.

The DMA engine 208 may execute instructions to perform DMA operations for sequential consecutive DMA transfers 212a-212d using a single queue. In certain examples, one logical queue may be mapped to one physical queue. In some implementations, a semaphore (or Sem) may be used by the neural network processor for synchronization of DMA transfers and the computing engines. As an example, the Sem value may be incremented by the DMA engine 208 after performing each DMA transfer. The Sem may be initialized to 0 before starting an inference or training operation. The DMA engine 208 may increment the Sem value to 1 after performing the first DMA transfer 212a, to 2 after performing the second DMA transfer 212b, to 3 after performing the third DMA transfer 212c, and to 4 after performing the fourth DMA transfer 212d. The DMA operations may be performed based on DMA descriptors provided in the instructions. For example, the DMA descriptors may include information associated with the semaphore, source address, destination address, transfer size, and any other relevant data.

The activation engine 206 may be configured to perform activation operations 106a-106b sequentially, and the PE array 204 may be configured to perform MM operations 108a-108b sequentially, as discussed with reference to FIG. 1. The PE array 204 or the activation engine 206 may wait for the semaphore to reach a respective threshold value to determine that the respective DMA transfer has completed. In this specification, a semaphore reaching a threshold value may imply that the semaphore value has become greater than or equal to the threshold value. As shown by an edge 214a, the activation engine 206 may wait for the Sem value to be greater than or equal to 1 before executing the ACT1 operation 106a. Similarly, as shown by an edge 214b, the PE array 204 may wait for the Sem value to be greater than or equal to 2 before executing the MM2 operation 108a. As shown by an edge 214c, the activation engine 206 may wait for the Sem value to be greater than or equal to 3 before executing the ACT3 operation 106b. Similarly, as shown by an edge 214d, the PE array 204 may wait for the Sem value to be greater than or equal to 4 before executing the MM4 operation 108b.

Note that instead of waiting for the Sem to be equal to a specific value, greater than or equal to that specific value is used in case the Sem value has become higher while the waiting engine is still executing a previous instruction or otherwise busy. The DMA engine 208 may increment the Sem value after completing each DMA transfer regardless of whether an engine waiting for a specific Sem value is ready to use the results of that DMA transfer. For example, in certain instances, the activation engine 206 may not be ready to perform the ACT1 operation 106a when the Sem value becomes 1; however, the DMA engine 208 may start performing the second DMA transfer 212b and increment the Sem value to 2 after completing the second DMA transfer 212b. When the activation engine 206 gets ready to perform the ACT1 operation 106a, the Sem value may have become 2 but the activation engine 206 may still be waiting for the Sem value to be 1 and not perform the ACT1 operation 106a. Therefore, waiting for greater than or equal to the specific value can allow the activation engine 206 to exit the wait state and perform the ACT1 operation 106a even after the Sem value has increased to 2 since the PE array 204 and the activation engine 206 may be able to execute concurrently.

As discussed with reference to FIG. 2, a single semaphore can be used to synchronize DMA transfers for concurrent execution of the pooling engine 202, DMA engine 208, PE array 204 and/or the activation engine 206 using a single DMA queue. However, in certain examples, one DMA queue may not be enough for large amount of data transfers via DMA, and parallel DMA transfers on multiple DMA queues may be required. Based on the speed up necessary for the DMA transfers, different numbers of DMA queues may be used. This is further explained with reference to FIG. 3.

Figure 3:
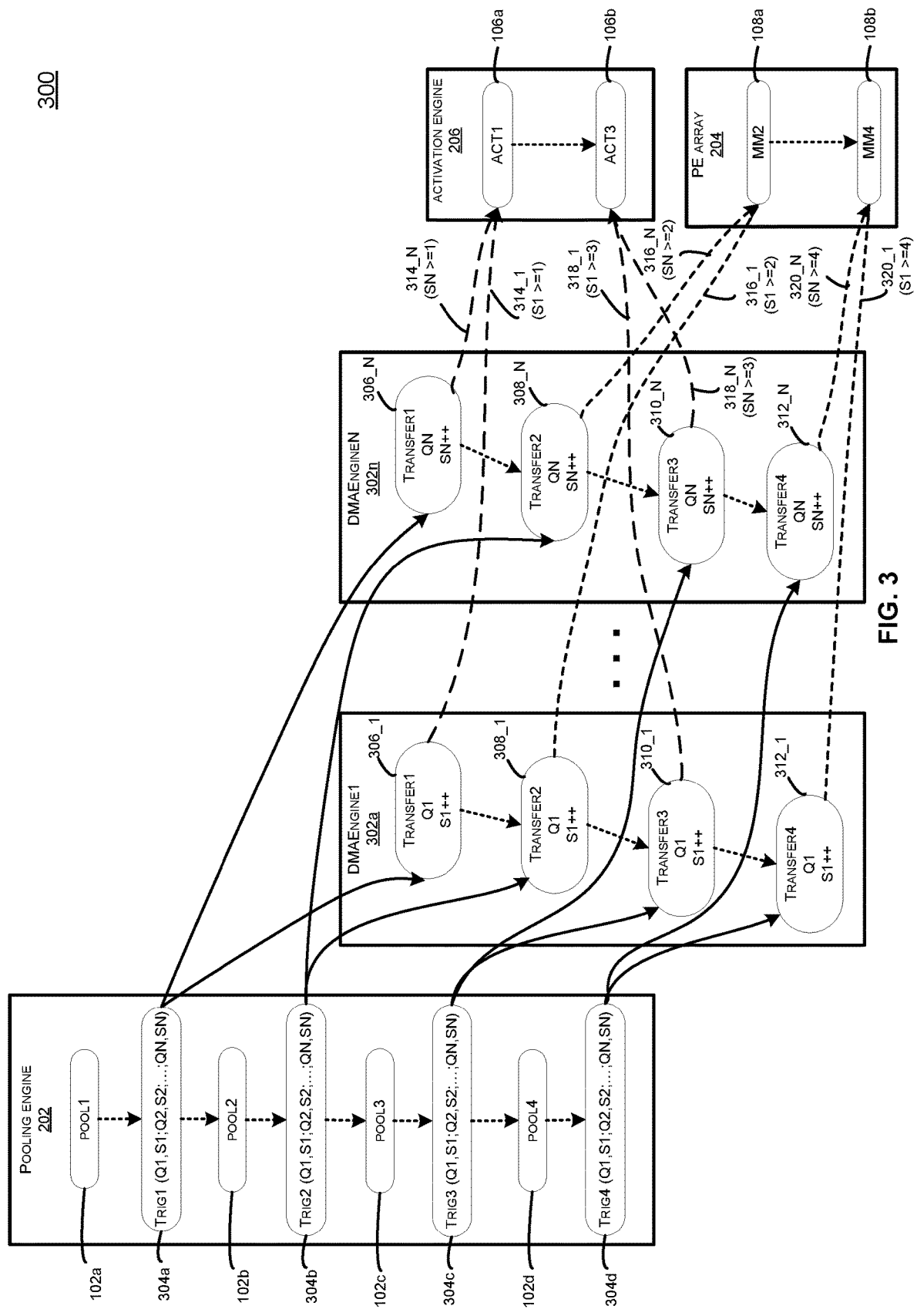
FIG. 3 illustrates an apparatus, which can be used to provide DMA synchronization for N DMA transfers using N semaphores.

FIG. 3 illustrates an apparatus 300, which can be used to provide DMA synchronization for N DMA transfers using N semaphores. The apparatus 300 may be part of a neural network processor configured to perform neural network computations. The apparatus 300 may include the pooling engine 202, PE array 204, and the activation engine 206 as discussed with reference to FIG. 2. The apparatus 300 may also include N DMA engines to perform N concurrent DMA transfers on N DMA queues. Note that only 2 out of N DMA engines are shown in FIG. 3 for ease of illustration. As an example, N can be 16 or another suitable number.

The pooling engine 202 can trigger multiple aggregate DMA transfers to be performed by the N DMA engines sequentially. As shown in FIG. 3, a first aggregate DMA transfer may be triggered by performing a TRIG1 operation 304a, a second aggregate DMA transfer may be triggered by performing a TRIG2 operation 304b, a third aggregate DMA transfer may be triggered by performing a TRIG3 operation 304c, and a fourth aggregate DMA transfer may be triggered by performing a TRIG4 operation 304d. Each aggregate DMA transfer may include N DMA transfers with one of the N semaphores assigned to each DMA transfer of the N DMA transfers, respectively. For example, the first aggregate DMA transfer may include a DMA transfer1 306_1, a DMA transfer1 306_2, . . . , and a DMA transfer1 306_N. A semaphore S1 may be assigned to the DMA transfer1 306_1, a semaphore S2 may be assigned to the DMA transfer1 306_2, . . . , and a semaphore SN may be assigned to the DMA transfer1 306_N. The second aggregate DMA transfer may include a DMA transfer2 308_1, a DMA transfer2 308_2, . . . , and a DMA transfer2 308_N. The semaphore S1 may be assigned to the DMA transfer2 308_1, the semaphore S2 may be assigned to the DMA transfer2 308_2, . . . , and the semaphore SN may be assigned to the DMA transfer2 308_N. The third aggregate DMA transfer may include a DMA transfer3 310_1, a DMA transfer3 310_2, . . . , and a DMA transfer3 310_N. The semaphore S1 may be assigned to the DMA transfer3 310_1, the semaphore S2 may be assigned to the DMA transfer3 310_2, . . . , and the semaphore SN may be assigned to the DMA transfer3 310_N. The fourth aggregate DMA transfer may include a DMA transfer4 312_1, a DMA transfer4 312_2, . . . , and a DMA transfer4 312_N. The semaphore S1 may be assigned to the DMA transfer4 312_1, the semaphore S2 may be assigned to the DMA transfer4 312_2, . . . , and the semaphore SN may be assigned to the DMA transfer4 312_N.

The TRIG1 operation 304a may trigger the DMA transfer1 306_1 on a Q1 in the DMAEngine1 0 302a, and the DMA transfer1 306_N on a QN in the DMAEngineN 302n. The DMAEngine1 302a may increment the semaphore S1 after performing the DMA transfer1 306_1, and the DMAEngineN 302n may increment the semaphore SN after performing the DMA transfer1 306_N. The TRIG2 operation 304b may trigger the DMA transfer2 308_1 on the Q1 in the DMAEngine1 302a, and the DMA transfer2 308_N on the QN in the DMAEngineN 302n. The DMAEngine1 302a may increment the semaphore S1 after performing the DMA transfer2 308_1, and the DMAEngineN 302n may increment the semaphore SN after performing the DMA transfer2 308_N. The TRIG3 operation 304c may trigger the DMA transfer3 310_1 on the Q1 in the DMAEngine1 302a, and the DMA transfer3 310_N on the QN in the DMAEngineN 302n. The DMAEngine1 302a may increment the semaphore S1 after performing the DMA transfer3 310_1, and the DMAEngineN 302n may increment the semaphore SN after performing the DMA transfer3 310_N. The TRIG4 operation 304d may trigger the DMA transfer4 312_1 on the Q1 in the DMAEngine1 302a, and the DMA transfer4 312_N on the QN in the DMAEngineN 302n. The DMAEngine1 302a may increment the semaphore S1 after performing the DMA transfer4 312_1, and the DMAEngineN 302n may increment the semaphore SN after performing the DMA transfer4 312_N.

If the N semaphores were reset to 0 before triggering the first aggregate DMA transfer, each of the N semaphores can be incremented to 1 after the first aggregate DMA transfer, to 2 after the second aggregate DMA transfer, to 3 after the third aggregate DMA transfer, and to 4 after the fourth aggregate DMA transfer. Each of the activation engine 206 and the PE array 204 may wait for each of the N semaphores to reach a threshold value before performing a respective operation. For example, the activation engine 206 may wait for each of the semaphores S1, S2, . . . , SN to be greater than or equal to 1 before performing the ACT1 operation 106a, as shown by edges 314_1, . . . , 314_N in FIG. 3. The PE array 204 may wait for each of the semaphores S1, S2, . . . , SN to be greater than or equal to 2 before performing the MM2 operation 108a, as shown by edges 316_1, . . . , 316_N in FIG. 3. Similarly, the activation engine 206 may wait for each of the semaphores S1, S2, . . . , SN to be greater than or equal to 3 before performing the ACT3 operation 106b, as shown by edges 318_1, . . . , 318_N in FIG. 3. The PE array 204 may wait for each of the semaphores S1, S2, . . . , SN to be greater than or equal to 4 before performing the MM4 operation 108b, as shown by edges 320_1, . . . , 320_N in FIG. 3.

As discussed with reference to FIG. 3, in certain systems, N semaphores can be used for synchronization of N concurrent DMA transfers on the N DMA queues. However, for a high value of N (e.g., 16 or more), use of N semaphores may require a large number of hardware registers for the semaphores adding to the chip area and complexity. Furthermore, the activation engine 206 and the PE array 204 may have to execute a large number of wait instructions before performing an operation. For example, for N equal to 16, each waiting engine may have to execute 16 wait instructions in parallel which can introduce delays at the system level and affect the system performance. Embodiments can be used to optimize DMA synchronization among the engines using M semaphores for the N DMA queues, where M is smaller than N, as discussed with reference to FIG. 4.

Figure 4:
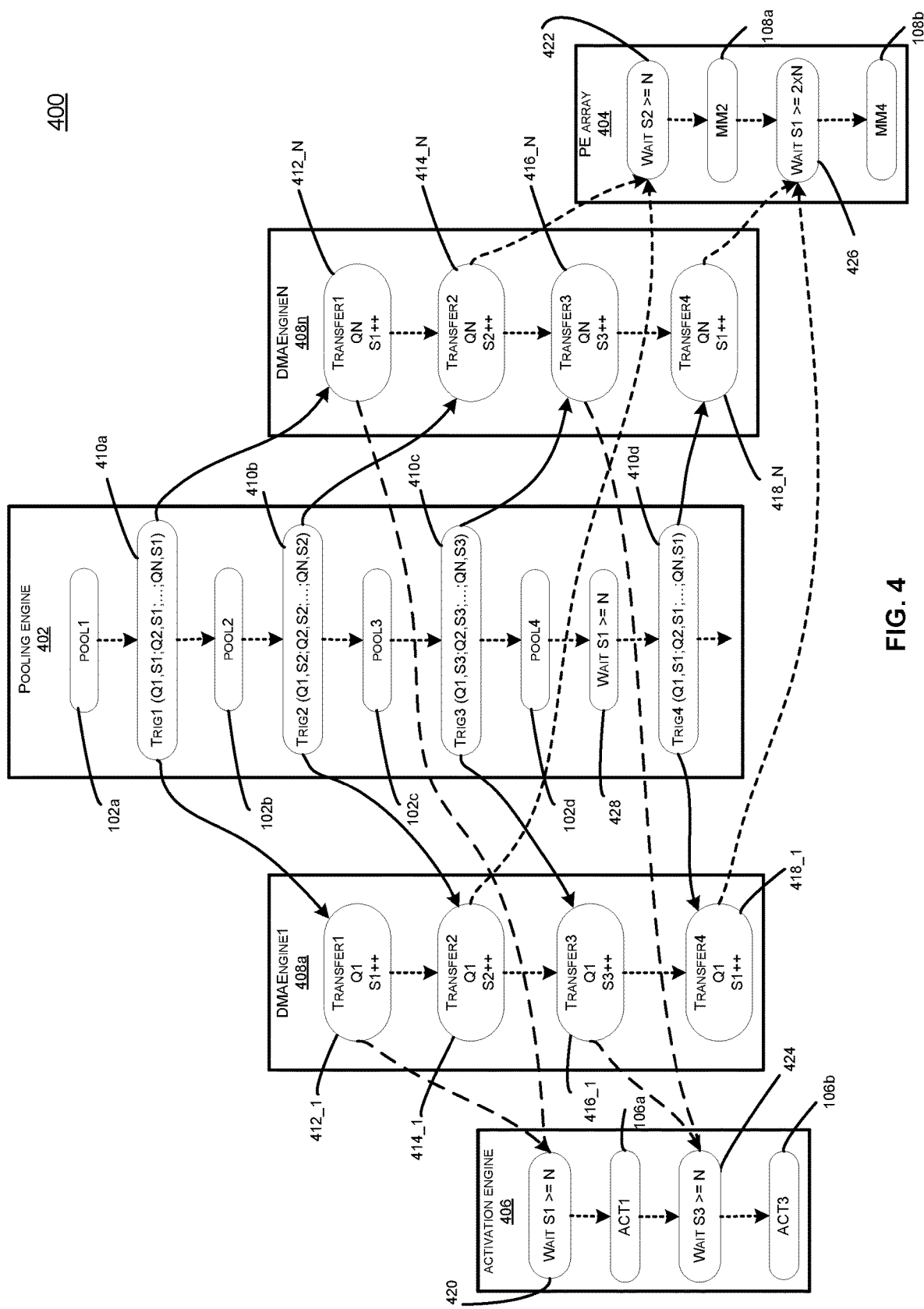
FIG. 4 illustrates an apparatus, which can provide synchronization for a plurality of aggregate DMA transfers for a neural network using 3 semaphores, according to certain embodiments.

FIG. 4 illustrates an apparatus 400 which can provide synchronization for a plurality of aggregate DMA transfers for a neural network using 3 semaphores, according to certain embodiments.

The apparatus 400 may be part of a neural network processor configured to perform neural network computations for training or inference operations associated with a neural network. The operations performed by different engines and their inter-dependencies can be represented using a neural network graph like the neural network graph 100. The neural network graph can be used to generate a neural network model which can be trained to perform a certain task. The neural network model can be compiled by a compiler to generate machine level instructions that can be executed by different components of the neural network processor to perform certain embodiments. For example, the apparatus 400 may include a pooling engine 402, a PE array 404, an activation engine 406, and N DMA engines 408a-408n. Each DMA engine of the N DMA engines 408a-408n may include one or more queues; however, for discussion purposes, one queue per DMA engine is shown in FIG. 4. For example, a DMAEngine1 408a may include a first queue Q1 and a DMAEngineN 408n may include an Nth queue QN.

A pooling engine 402 can perform the pooling operations 102a-102d as discussed with reference to the pooling engine 202 in FIG. 2. The pooling engine 402 can further trigger a plurality of aggregate DMA transfers on the N DMA engines, sequentially. Each aggregate DMA transfer may be triggered by executing a single instruction, and can be assigned to one or more semaphores from the M semaphores. Each aggregate DMA transfer may include N DMA transfers, where M is smaller than N. Each DMA transfer of the N DMA transfers may be assigned to one of the assigned one or more semaphores from the M semaphores. In certain examples, each aggregate DMA transfer may be assigned to one of the M semaphores in a round robin manner. Therefore, each DMA transfer of the N DMA transfers may be assigned to the semaphore assigned to the respective aggregate DMA transfer. For example, the pooling engine 402 may trigger a first aggregate DMA transfer on the N DMA engines by performing a TRIG1 operation 410a. According to certain embodiments, a first semaphore S1 can be assigned to each DMA transfer of the first aggregate DMA transfer. Next, the pooling engine 402 may trigger a second aggregate DMA transfer on the N DMA engines by performing a TRIG2 operation 410b. A second semaphore S2 can be assigned to each DMA transfer of the second aggregate DMA transfer. Next, the pooling engine 402 may trigger a third aggregate DMA transfer on the N DMA engines by performing a TRIG3 operation 410c. A third semaphore S3 can be assigned to each DMA transfer of the third aggregate DMA transfer.

The TRIG1 operation 410a may trigger N concurrent DMA transfers including a DMA transfer1 412_1 on Q1 in the DMAEngine1 408a, and a DMA transfer1 412_N on QN in the DMAEngineN 408n. The N DMA transfers may include other DMA transfers on DMA queues Q2, Q3, . . . , QN−1, which are not shown in FIG. 4 for ease of illustration. Each DMA engine may increment the assigned semaphore after performing the respective DMA transfer. For example, the DMAEngine1 408a may increment the value of semaphore S1 after performing the DMA transfer1 412_1, and the DMAEngineN 408n may increment the value of semaphore S1 after performing the DMA transfer1 412_N. As an example, if the semaphores S1, S2 and S3 were initialized to 0 before the TRIG1 operation 410a, the DMAEngine1 408a may increment the value of semaphore S1 to 1 and the DMAEngineN 408n may increment the value of semaphore S1 to N. For N equal to 16, the semaphore S1 may have a value of 16 after completion of the first aggregate DMA transfer. Note that the value of semaphore S1 may be incremented by the DMA engines 408a-408n in any order. For example, the DMAEngineN 408n may increment the value of semaphore S1 before the DMAEngine1 408a.

The TRIG2 operation 410b may trigger N concurrent DMA transfers including a DMA transfer2 414_1 on the Q1 in the DMAEngine1 408a, and a DMA transfer2 414_N on the QN in the DMAEngineN 408n. The DMAEngine1 408a may increment the value of semaphore S2 to 1 after performing the DMA transfer2 414_1, and the DMAEngineN 408n may increment the value of semaphore S2 to 16 after performing the DMA transfer2 414_N. The TRIG3 operation 410c may trigger N concurrent DMA transfers including a DMA transfer3 416_1 on the Q1 in the DMAEngine1 408a, and a DMA transfer3 416_N on the QN in the DMAEngineN 408n. The DMAEngine1 408a may increment the value of semaphore S3 to 1 after performing the DMA transfer3 416_1, and the DMAEngineN 408n may increment the value of semaphore S3 to 16 after performing the DMA transfer3 416_N. In different examples, size of each DMA transfer for each aggregate DMA transfer may or may not be uniform, and therefore the assigned semaphore may be incremented at different times by different DMA engines. For example, each of the DMA engines 408a-408n may increment the value of the respective semaphore out of order based on the size of the respective DMA transfer and time distribution. Note that, in the event of two DMA engines attempting to increment a semaphore at the same time, an arbitration method can be employed to mitigate the race condition.

The PE array 404 or the activation engine 406 may wait for a semaphore to reach a threshold value to determine that a respective aggregate DMA transfer has completed before performing an operation. For example, the PE array 404 or the activation engine 406 may use a portion of data from the respective aggregate DMA transfer to perform the operation. In certain embodiments, the activation engine 406 may execute a wait instruction 420 to wait for the semaphore S1 to reach a threshold value of N before performing the ACT1 operation 106a. The semaphore S1 reaching the threshold value of N may imply that the value of S1 has become greater than or equal to N, and may indicate completion of the first aggregate transfer including the N DMA transfers 412_1 to 412_N. Similarly, the PE array 404 may execute a wait instruction 422 to wait for the semaphore S2 to reach a threshold value of N before performing the MM2 operation 108a. The semaphore S2 reaching the threshold value of N may imply that the value of S2 has become greater than or equal to N, and may indicate completion of the second aggregate transfer including the N DMA transfers 414_1 to 414_N. Next, the activation engine 406 may execute a wait instruction 424 to wait for the semaphore S3 to reach a threshold value of N before performing the ACT3 operation 106b. The semaphore S3 reaching the threshold value of N may imply that the value of S3 has become greater than or equal to N, and may indicate completion of the third aggregate transfer including the N DMA transfers 416_1 to 416_N.

Although not shown in FIG. 4, in certain examples, the PE array 404 and the activation engine 406 may wait for a semaphore to reach the same threshold value for a given DMA transfer. For example, both the PE array 404 and the activation engine 406 may wait for the S1 value to be greater than or equal to N to perform the MM2 operation 108a and the ACT1 operation 106a, respectively. Thus, according to certain embodiments, the PE array 404 and the activation engine 406 may have to execute a single wait instruction to compare the value of one semaphore as compared to N semaphores. The semaphores S1, S2, and S3 can be used in a round robin manner for each aggregate DMA transfer triggered by the pooling engine 404, as discussed with reference to FIG. 5.

FIG. 5 shows a table 500 with example values of the semaphores S1, S2, and S3 for a plurality of aggregate DMA transfers with one semaphore assigned to each aggregate DMA transfer, according to certain embodiments.

A trigger operation 502 shows example TRIG operations TRIG1 502_1, TRIG2 502_2, TRIG3 502_3, TRIG4 502_4, TRIG5 502_5, and TRIG6 502_6 for N equal to 16 and M equal to 3. Each trigger operation 502 can trigger an aggregate DMA transfer comprising 16 concurrent DMA transfers on 16 DMA queues Q1-Q16. In certain examples, a first semaphore S1 504, a second semaphore S2 506, and a third semaphore S3 508 can be alternated for each aggregate DMA transfer in a round-robin manner. As shown in the table 500, the first semaphore S1 504, the second semaphore S2 506, or the third semaphore S3 508 can be assigned to the DMA queues Q1-Q16 alternatively for each aggregate DMA transfer. Each DMA transfer of the 16 DMA transfers can be assigned to one of the assigned semaphores for a respective aggregate DMA transfer The first semaphore S1 504, the second semaphore S2 506, and the third semaphore S3 508 can be same as the semaphores S1, S2, and S3, respectively, of FIG. 4.

Each trigger operation 502 can trigger an aggregate DMA transfer on the N DMA queues in the N DMA engines 408a-408n. As an example, the TRIG1 502_1 operation can trigger a first aggregate DMA transfer assigned to the semaphore S1, TRIG2 502_2 operation can trigger a second aggregate DMA transfer assigned to the semaphore S2, TRIG3 502_3 operation can trigger a third aggregate DMA transfer assigned to the semaphore S3, TRIG4 502_4 operation can trigger a fourth aggregate DMA transfer assigned to the semaphore S1, TRIG5 502_5 operation can trigger a fifth aggregate DMA transfer assigned to the semaphore S2, and the TRIG6 502_6 operation can trigger a sixth aggregate DMA transfer assigned to the semaphore S3. As an example, the TRIG1 502_1 operation can be same as the TRIG1 410a operation, the TRIG2 502_2 operation can be same as the TRIG2 410b operation, and TRIG3 502_3 operation can be same as the TRIG3 410c operation. Each DMA transfer for the first aggregate DMA transfer can be assigned to the semaphore S1, for the second aggregate DMA transfer can be assigned to the semaphore S2, for the third aggregate DMA transfer can be assigned to the semaphore S3, for the fourth aggregate DMA transfer can be assigned to the semaphore S1, for the fifth aggregate DMA transfer can be assigned to the semaphore S2, and for the sixth aggregate DMA transfer can be assigned to the semaphore S3. As shown in FIG. 5, only one of the semaphores is incremented for each aggregate DMA transfer, according to certain embodiments.

As an example, the value of S1 504 can be incremented by each DMA engine of the DMA engines 408a-408n after performing a respective DMA transfer of the N DMA transfers of the first aggregate DMA transfer. Thus, the value of S1 504 may be incremented to 16 after completion of the first aggregate DMA transfer. Similarly, the value of S2 506 can be incremented by each DMA engine of the DMA engines 408a-408n after performing a respective DMA transfer of the N DMA transfers of the second aggregate DMA transfer. Thus, the value of S2 506 may be incremented to 16 after completion of the second aggregate DMA transfer. Next, the value of S3 508 can be incremented by each DMA engine of the DMA engines 408a-408n after performing a respective DMA transfer of the N DMA transfers of the third aggregate DMA transfer. Thus, the value of S3 508 may be incremented to 16 after completion of the third aggregate DMA transfer. After the third aggregate DMA transfer, the semaphores S1, S2, and S3 can be re-assigned to the next round of aggregate DMA transfers.

Before re-assigning each semaphore for the next round, the pooling engine 402 may determine that a previous aggregate DMA transfer incrementing the assigned semaphore has been completed based upon the assigned semaphore reaching a threshold value. For example, referring back to FIG. 4, the pooling engine 402 may execute a wait instruction 428 to determine whether the semaphore S1 has reached a threshold value of N indicating that all the N DMA transfers from the first aggregate DMA transfer has been completed. If the semaphore S1 has reached the threshold value, the pooling engine 402 can re-assign the semaphore S1 to a subsequent aggregate DMA transfer. For example, the pooling engine 402 may re-assign the semaphore S1 to a fourth aggregate DMA transfer. The pooling engine 404 may trigger the fourth aggregate DMA transfer by performing a TRIG4 operation 410d to trigger N concurrent DMA transfers including a DMA transfer4 418_1 on the Q1 in the DMAEngine1 408a, and a DMA transfer4 418_N on the QN in the DMAEngineN 408n. Each of the DMAEngine1 408a-DMAEngineN 408n may increment the value of semaphore S1 after performing a respective DMA transfer, and therefore the value of semaphore S1 may be 2×N after completion of the fourth aggregate DMA transfer. Referring back to FIG. 5, the value of semaphore S1 504 after performing the fourth aggregate DMA transfer may be 32, and the value of semaphore S2 506 and the semaphore S3 508 may be 16.

As discussed previously, waiting for a semaphore value to become greater than or equal to a threshold value, instead of equal to the threshold value, is used in case the semaphore value has become higher while the waiting engine is still executing a previous instruction or otherwise busy. For example, if the activation engine 406 was waiting for the value of S1 to be equal to N, instead of greater than or equal to N, the activation engine 406 may get deadlocked when it is ready to execute the wait instruction 420 since the value of S1 may have become more than N after the TRIG4 operation 410d. Similarly, waiting on greater than or equal to the threshold value of S2 can allow the PE array 404 to exit the wait instruction 422 and perform the MM2 operation 108a even after the value of S2 becomes greater than N.

As shown in FIG. 4, the PE array 404 may execute a wait instruction 426 for the semaphore S1 to reach a threshold value of 2×N (e.g., 32) before performing the MM4 operation 108b. The semaphore S1 reaching the threshold value of 2×N may indicate completion of the fourth aggregate transfer including the N DMA transfers 418_1 to 418_N. Similarly, the semaphore S2 can be re-assigned to a fifth aggregate DMA transfer after the second aggregate DMA transfer has been completed by executing a TRIG5 operation, and the semaphore S3 can be re-assigned to a sixth aggregate DMA transfer after the third aggregate DMA transfer has been completed by executing a TRIG6 operation as shown in FIG. 5. After performing the fifth aggregate DMA transfer, the value of semaphore S2 506 will be 32, and after performing the sixth aggregate DMA transfer, the value of semaphore S3 508 will be 32. Thus, the semaphores S1, S2 and S3 can be assigned in a round robin manner over the plurality of aggregate DMA transfers.

Note that alternating the M semaphores for the N DMA queues in a round-robin manner can be optimal when the size and the time distribution of the DMA transfers are uniform. However, when the size or the time distribution of the DMA transfers is not uniform, the compiler can estimate the start and end times for each transfer and alternate the semaphores in a different manner, as discussed with reference to FIG. 6.

FIG. 6 shows a table 600 with example values of the semaphores S1, S2, and S3 for a plurality of aggregate DMA transfers with 2 out of 3 semaphores assigned to each aggregate DMA transfer, according to certain embodiments.

A trigger operation 602 shows example TRIG operations TRIG1 602_1, TRIG2 602_2, TRIG3 602_3, TRIG4 602_4, TRIG5 602_5, and TRIG6 602_6 for N equal to 16 and M equal to 3. Each TRIG operation 602_1-602_6 can trigger a respective aggregate DMA transfer comprising 16 DMA transfers on 16 DMA queues Q1-Q16. In certain examples, 2 semaphores out of the first semaphore S1 504, the second semaphore S2 506, and the third semaphore S3 508 can be assigned to each aggregate DMA transfer. Each DMA transfer of the 16 DMA transfers can be assigned to one of the assigned semaphores for a respective aggregate DMA transfer. As an example, the first semaphore S1 504 can be assigned to the DMA queues Q1-Q10, and the second semaphore S2 506 and the third semaphore S3 508 can be assigned to the DMA queues Q11-Q16 alternatively for each aggregate DMA transfer.

As shown in FIG. 6, the TRIG1 602_1 operation can trigger a first aggregate DMA transfer including a portion of the N DMA transfers (e.g., DMA transfers 1-10) assigned to the semaphore S1 and remaining DMA transfers of the N DMA transfers (e.g., DMA transfers 11-16) assigned to the semaphore S2. The TRIG2 602_2 operation can trigger a second aggregate DMA transfer including a portion of the N DMA transfers (e.g., DMA transfers 1-10) assigned to the semaphore S1 and remaining DMA transfers of the N DMA transfers (e.g., DMA transfers 11-16) assigned to the semaphore S3. The TRIG3 602_3 operation can trigger a third aggregate DMA transfer including a portion of the N DMA transfers (e.g., DMA transfers 1-10) assigned to the semaphore S1 and remaining DMA transfers of the N DMA transfers (e.g., DMA transfers 11-16) assigned to the semaphore S2. The TRIG4 602_4 operation can trigger a fourth aggregate DMA transfer including a portion of the N DMA transfers (e.g., DMA transfers 1-10) assigned to the semaphore S1 and remaining DMA transfers of the N DMA transfers (e.g., DMA transfers 11-16) assigned to the semaphore S3. The TRIG5 602_5 operation can trigger a fifth aggregate DMA transfer including a portion of the N DMA transfers (e.g., DMA transfers 1-10) assigned to the semaphore S1 and remaining DMA transfers of the N DMA transfers (e.g., DMA transfers 11-16) assigned to the semaphore S2. The TRIG6 602_6 operation can trigger a sixth aggregate DMA transfer including a portion of the N DMA transfers (e.g., DMA transfers 1-10) assigned to the semaphore S1 and remaining DMA transfers of the N DMA transfers (e.g., DMA transfers 11-16) assigned to the semaphore S3.

As an example, for each aggregate DMA transfer, the value of S1 504 can be incremented by each of the 10 DMA engines (DMAEngine1-DMAEngine10) after performing a respective DMA transfer of the 10 DMA transfers. Thus, the value of S1 504 may be incremented to 10 after completion of the first aggregate DMA transfer, to 20 after completion of the second aggregate DMA transfer, to 30 after completion of the third aggregate DMA transfer, to 40 after completion of the fourth aggregate DMA transfer, to 50 after completion of the fifth aggregate DMA transfer, and to 60 after completion of the sixth aggregate DMA transfer. Similarly, the value of S2 506 or S3 508 can be incremented by each of the 6 DMA engines (DMAEngine11-DMAEngine16) after performing a respective DMA transfer of the remaining 6 DMA transfers for each aggregate DMA transfer. Thus, the value of S2 506 may be incremented to 6 after completion of the first aggregate DMA transfer, to 12 after completion of the third aggregate DMA transfer, and to 18 after completion of the fifth aggregate DMA transfer. Similarly, the value of S3 508 may be incremented to 6 after completion of the second aggregate DMA transfer, to 12 after completion of the fourth aggregate DMA transfer, and to 18 after completion of the sixth aggregate DMA transfer.

Before re-assigning the one or more semaphores to a subsequent aggregate DMA transfer, the pooling engine 402 may determine that one or more previous aggregate DMA transfers incrementing the assigned one or more semaphores have completed based upon the one or more assigned semaphores reaching respective threshold values. As discussed with reference to FIG. 4, the pooling engine 402 may execute one or more wait instructions (less than or equal to M), like the wait instruction 428, to determine whether the one or more assigned semaphores have reached the respective threshold values.

As an example, before performing the TRIG2 602_2 operation, the pooling engine 402 may execute a first wait instruction to wait upon the semaphore S1 504 to reach a threshold value of 10, which may indicate that the 10 DMA transfers of the first aggregate transfer that can increment S1 are complete. Note that for the TRIG2 602_2 operation, a second wait instruction may not be executed to wait on S3 since S3 has not been incremented yet for a previous aggregate DMA transfer. Similarly, before performing the TRIG3 602_3 operation, the pooling engine 402 may execute a first wait instruction to wait upon the semaphore S1 504 to reach a threshold value of 20 and a second wait instruction to wait upon the semaphore S2 to reach a threshold value of 6, which may indicate that the 10 DMA transfers of the second aggregate transfer that can increment S1 and the 6 DMA transfers of the first aggregate transfer that can increment S2 are complete. Next, before performing the TRIG4 602_4 operation, the pooling engine 402 may execute a first wait instruction to wait upon the semaphore S1 504 to reach a threshold value of 30 and a second wait instruction to wait upon the semaphore S3 to reach a threshold value of 6, which may indicate that the 10 DMA transfers of the third aggregate transfer that can increment S1 and the 6 DMA transfers of the second aggregate transfer that can increment S3 are complete. Similar wait instructions can be executed by the pooling engine 402 before performing the remaining TRIG operations including the TRIG5 602_5 and TRIG6 602_6 operations for the plurality of aggregate DMA transfers. Note that executing 2 wait instructions for the N DMA transfers for each aggregate DMA transfer can still provide better performance as compared to N wait instructions for the N DMA transfers.

Figure 7:
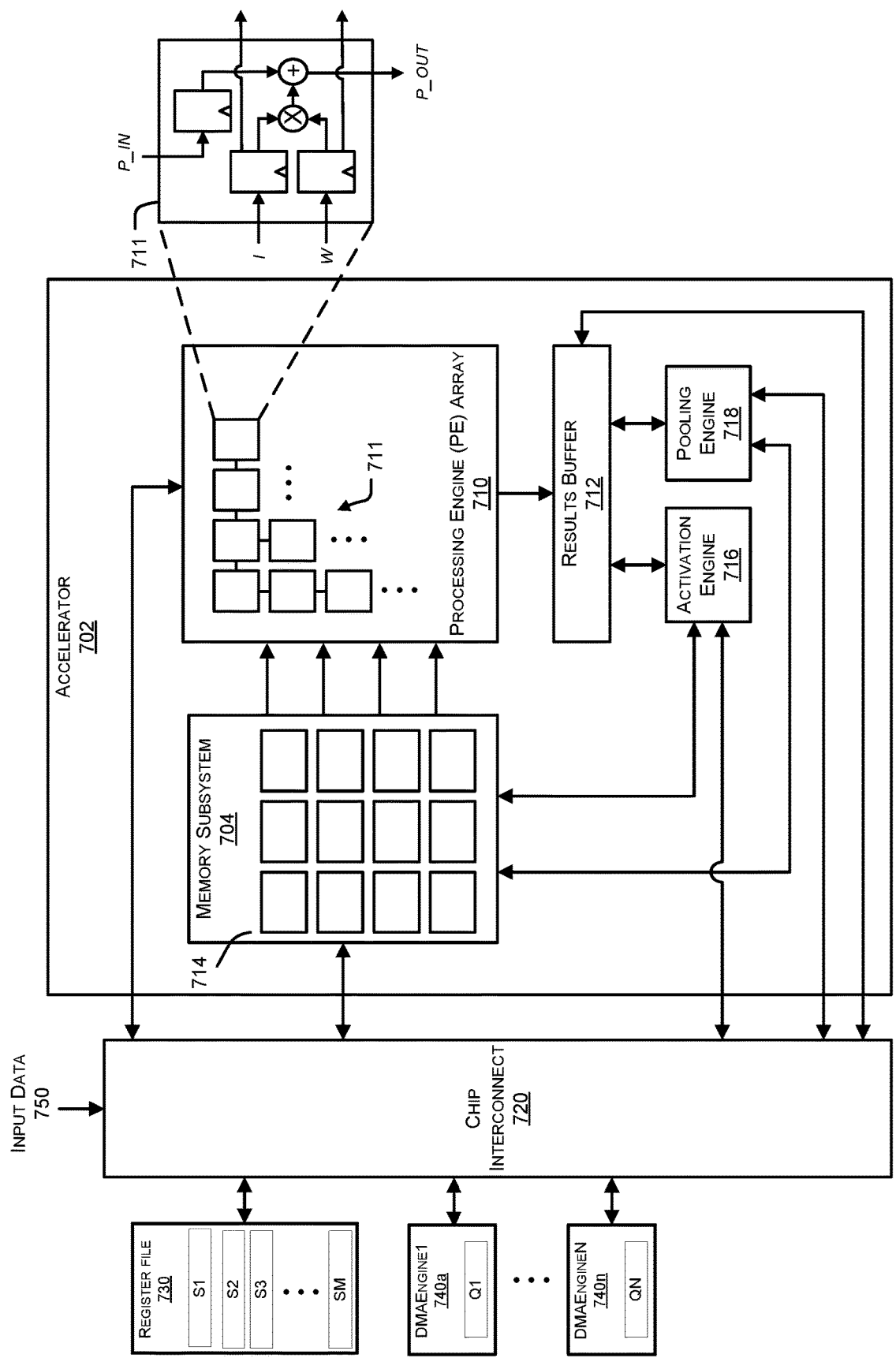
FIG. 7 is a block diagram illustrating an example of an integrated circuit device that can perform DMA synchronization using M semaphores for N DMA queues, according to certain embodiments.

FIG. 7 is a block diagram illustrating an example of an integrated circuit device that can perform DMA synchronization using M semaphores for N DMA queues, according to certain embodiments. The example of FIG. 7 illustrates an accelerator 702. In various examples, the accelerator 702, for a set of input data (e.g., input data 750), can execute computations using a PE array 710, an activation engine 716, and/or a pooling engine 718. Note that the accelerator 702 may include other components, which are not shown here for the purposes of simplicity. In some examples, the example accelerator 702 may be an integrated circuit component of a processor, such as a neural network processor. The processor may have other integrated circuit components, including additional accelerator engines. In certain examples, the PE array 710, activation engine 716, and the pooling engine 718 can be the PE array 404, activation engine 406, and the pooling engine 402, respectively, of FIG. 4.

In various implementations, the memory subsystem 704 can include multiple memory banks 714. In these implementations, each memory bank 714 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 714. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 704 can permit simultaneous access to the read or write channels of multiple memory banks. As another example, the memory subsystem 704 can include arbitration logic such that arbitration between, for example, the outputs of multiple memory banks 714 can result in more than one memory bank's output being used. In these and other examples, though globally managed by the memory subsystem 704, each memory bank can be operated independently of any other.

Having the memory banks 714 be independently accessible can increase the efficiency of the accelerator 702. For example, values can be simultaneously read and provided to each row of the PE array 710, so that the entire PE array 710 can be in use in one clock cycle. As another example, the memory banks 714 can be read at the same time that results computed by the PE array 710 are written to the memory subsystem 704. In contrast, a single memory may be able to service only one read or write at a time. With a single memory, multiple clock cycles can be required, for example, to read input data for each row of the PE array 710 before the PE array 710 can be started.

In various implementations, the memory subsystem 704 can be configured to simultaneously service multiple clients, including the PE array 710, the activation engine 716, the pooling engine 718, and any external clients that access the memory subsystem 704 over a chip interconnect 720. In some implementations, being able to service multiple clients can mean that the memory subsystem 704 has at least as many memory banks as there are clients. In some cases, each row of the PE array 710 can count as a separate client. In some cases, each column of the PE array 710 can output a result, such that each column can count as a separate write client. In some cases, output from the PE array 710 can be written into the memory banks 714 that can then subsequently provide input data for the PE array 710. As another example, the activation engine 716 and the pooling engine 718 can include multiple execution channels, each of which can be separate memory clients. The memory banks 714 can be implemented, for example, using static random-access memory (SRAM).

In various implementations, the memory subsystem 704 can include control logic. The control logic can, for example, keep track of the address spaces of each of the memory banks 714, identify memory banks 714 to read from or write to, and/or move data between the memory banks 714. In some implementations, memory banks 714 can be hardwired to particular clients. For example, a set of memory banks 714 can be hardwired to provide values to the rows of the PE array 710, with one memory bank servicing each row. As another example, a set of memory banks can be hard wired to receive values from columns of the PE array 710, with one memory bank receiving data for each column.

The PE array 710 is the computation matrix of the example accelerator 702. The PE array 710 can, for example, execute parallel integration, convolution, correlation, and/or matrix multiplication, among other things. For example, the PE array 710 can execute instructions to perform different operations including MM2 108a and MM4 108b operations. In certain embodiments, the PE array 710 may execute a wait instruction to wait on a semaphore register to reach a threshold value before performing an operation. The PE array 710 includes multiple processing engines 711, arranged in rows and columns, such that results output by one processing engine 711 can be input directly into another processing engine 711. Processing engines 711 that are not on the outside edges of the PE array 710 thus can receive data to operate on from other processing engines 711, rather than from the memory subsystem 704.

In various examples, the PE array 710 uses systolic execution, in which data arrives at each processing engine 711 from different directions at regular intervals. In some examples, input data can flow into the PE array 710 from the left and weight values can be loaded at the top. In some examples weights and input data can flow from the left and partial sums can flow from top to bottom. In these and other examples, a multiply-and-accumulate operation moves through the PE array 710 as a diagonal wave front, with data moving to the right and down across the array. Control signals can be input at the left at the same time as weights, and can flow across and down along with the computation.

In various implementations, the number of columns in the PE array 710 determines the computational capacity of the PE array 710, and the number of rows determines the required memory bandwidth for achieving maximum utilization of the PE array 710. The PE array 710 can have, for example, 64 columns and 128 rows, or some other number of columns and rows.

An example of a processing engine 711 is illustrated in FIG. 7 in an inset diagram. As illustrated by this example, a processing engine 711 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 711.

In the illustrated example, an input from above can include a partial sum, pin, provided either from another processing engine 711 or from a previous round of computation by the PE array 710. When starting a computation for a new set of input data, the top row of the PE array 710 can receive a fixed value for p_in, such as zero. As illustrated by this example, i and w are multiplied together and the result is summed with p_in to produce a new partial sum, p_out, which can be input into another processing engine 711. Various other implementations of the processing engine 711 are possible.

Outputs from the last row in the PE array 710 can be temporarily stored in the results buffer 712. The results can be intermediate results, which can be written to the memory banks 714 to be provided to the PE array 710 for additional computation. Alternatively, the results can be final results, which, once written to the memory banks 714 can be read from the memory subsystem 704 over the chip interconnect 720, to be output by the system.

In some implementations, the accelerator 702 includes the activation engine 716. In these implementations, the activation engine 716 can combine the results from the PE array 710 into one or more output activations. For example, for a convolutional neural network, convolutions from multiple channels can be summed to produce an output activation for a single channel. In other examples, accumulating results from one or more columns in the PE array 710 may be needed to produce an output activation for a single node in the neural network. In some examples, the activation engine 716 can be bypassed.

In various examples, the activation engine 716 can include multiple separate execution channels. In these examples, the execution channels can correspond to the columns of the PE array 710, and can perform an operation on the outputs of a column, the result of which can be stored in the memory subsystem 704. In these examples, the activation engine 716 may be able to perform between 1 and n parallel computations, where n is equal to the number of columns in the PE array 710. In some cases, one or more of the computations can be performed simultaneously. Examples of computations that each execution channel can perform include exponentials, squares, square roots, identities, binary steps, bipolar steps, sigmoidals, and ramps, among other examples. In certain examples, the activation engine 716 may execute instructions to perform different operations (e.g., executing an activation function) including ACT1 106a, ACT3 106b, wait 420, or wait 424 in FIG. 4. In certain embodiments, the activation engine 716 may execute the wait instructions 420 or 424 to wait on a semaphore register to reach a threshold value before performing an operation.

In some implementations, the accelerator 702 can include a pooling engine 718 to perform pooling operations. For example, the pooling engine 718 can execute instructions to perform various operations including the pooling operations 102a-102d in FIG. 4. Pooling is the combining of outputs of the columns of the PE array 710. Combining can include for example, computing a maximum value, a minimum value, an average value, a median value, a summation, a multiplication, or another logical or mathematical combination. In various examples, the pooling engine 718 can include multiple execution channels that can operating on values from corresponding columns of the PE array 710. In these examples, the pooling engine 718 may be able to perform between 1 and n parallel computations, where n is equal to the number of columns in the PE array 710. In various examples, execution channels of the pooling engine 718 can operate in parallel and/or simultaneously. In some examples, the pooling engine 718 can be bypassed. Herein, the PE array 710, activation engine 716 and the pooling engine 718 may be referred to as computational engines.

In certain embodiments, in addition to the pooling operations, the pooling engine 718 may perform the TRIG operations to trigger DMA transfers for a plurality of aggregate DMA transfers, as described with reference to FIGS. 4-6. For example, the pooling engine 718 may perform various operations sequentially as shown in FIG. 4. As discussed with reference to FIGS. 4-6, each TRIG operation may trigger N DMA transfers on the N DMA engines DMAEngine1-DMAEngineN, respectively, for each aggregate DMA transfer. The pooling engine 718 may also execute instructions to wait on one or more semaphores, like the wait instruction 428, to allow the previous aggregate DMA transfers incrementing the same one or more semaphores to complete. In other examples, these wait instructions can be executed by other engines, e.g., the PE array 710 or the activation engine 716, without deviating from the scope of the disclosure.

Input data 750 can arrive over the chip interconnect 720. The chip interconnect 720 can connect the accelerator 702 to other components of a processor, such as N DMA engines including a DMAEngine1 740a and a DMAEngineN 740n. In certain examples, the DMA engines 740a-740n may be the DMA engines 408a-408n of FIG. 4. The chip interconnect 720 can also connect the accelerator 702 to a register file 730 comprising M semaphore registers S1-SM. For example, the M semaphore registers S1-SM may include the semaphore registers S1, S2, and S3 as described with reference to FIGS. 4-6. Each semaphore register of the registers S1-SM can be a hardware register of any suitable size, e.g., 8-bits, 16-bits, 24-bits, 32-bits, etc. The semaphores registers S1-SM can be initialized at reset, prior to an inference or a training operation, or as needed. The M semaphore registers S1-SM can be accessed by any component of the accelerator 702, or the DMA engines 740a-740n via the chip interconnect 720.

The DMA engines 740a-740n can be used to obtain input data 750 from an Input/Output (I/O) device, a storage drive, or a network interface. The input data 750 can be, for example one-dimensional data, such as a character string or numerical sequence, or two-dimensional data, such as an array of pixel values for an image or frequency and amplitude values over time for an audio signal. In some examples, the input data 750 can be three-dimensional, as may be the case with, for example, the situational information used by a self-driving car or virtual reality data. In some implementations, the memory subsystem 704 can include a separate buffer for the input data 750. In some implementations, the input data 750 can be stored in the memory banks 714 when the accelerator 702 receives the input data 750.

According to various embodiments, the DMA engines 740a-740n can perform a plurality of aggregate DMA transfers including the DMA transfers 412_1-412_N, 414_1-414_N, 416_1-416_N, and 418_1-418_N, and increment the value of respective one or more semaphores for each aggregate DMA transfer based on a round-robin method or another suitable method. In some implementations, each DMA engine of the DMA engines 740a-740n may include respective one or more DMA queues; however, for discussion purposes, one DMA queue per DMA engine is shown in FIG. 7. For example, a DMAEngine1 740a may include Q1 and a DMAEngineN 740n may include QN. The DMA queue(s) may be implemented using any suitable data structure including a circular buffer, or a first-in-first-out (FIFO) buffer, among others. The DMA queue(s) may be used to store data associated with the DMA transfers including the data to be transferred from a source address to a destination address for a given DMA transfer. For example, Q1 in the DMAEngine1 740a can be used to store data associated with the DMA transfer1 412_1, and QN in the DMAEngineN 740n can be used to store data associated with the DMA transferN 412_N.

Each DMA engine of the DMA engines 740a-740n may include a respective DMA controller, which can be used to perform the DMA transfers based on a DMA descriptor associated with each transfer. The DMA descriptor may be provided as part of an instruction to the DMA engine. In some implementations, the DMA descriptors may be stored in a host memory and a pointer to their location in the host memory may be provided in the instruction. The DMA controller may include functionality to decode the instructions to perform the DMA transfers based on the descriptors. The DMA controller may also include functionality to manage the M semaphore registers S1-SM including incrementing, decrementing, or resetting.

In some examples, the accelerator 702 can implement a neural network processing engine. In these examples, the accelerator 702, for a set of input data 750, can execute a neural network to perform a task for which the neural network was trained. Executing a neural network on a set of input data can be referred to as inference or performing inference.

The weights for the neural network can be stored in the memory subsystem 704, along with input data 750 on which the neural network will operate. The neural network can also include instructions, which can program the PE array 710 to perform various computations on the weights and the input data. The instructions can also be stored in the memory subsystem 704, in the memory banks 714 or in a separate instruction buffer. The PE array 710 can output intermediate results, which represent the outputs of individual layers of the neural network. In some cases, the activation engine 716 and/or pooling engine 718 may be enabled for computations called for by certain layers of the neural network. The accelerator 702 can store the intermediate results in the memory subsystem 704 for inputting into the PE array 710 to compute results for the next layer of the neural network. The PE array 710 can further output final results from a last layer of the neural network. The final results can be stored in the memory subsystem 704 and then be copied out to host processor memory or to another location.

Figure 8:
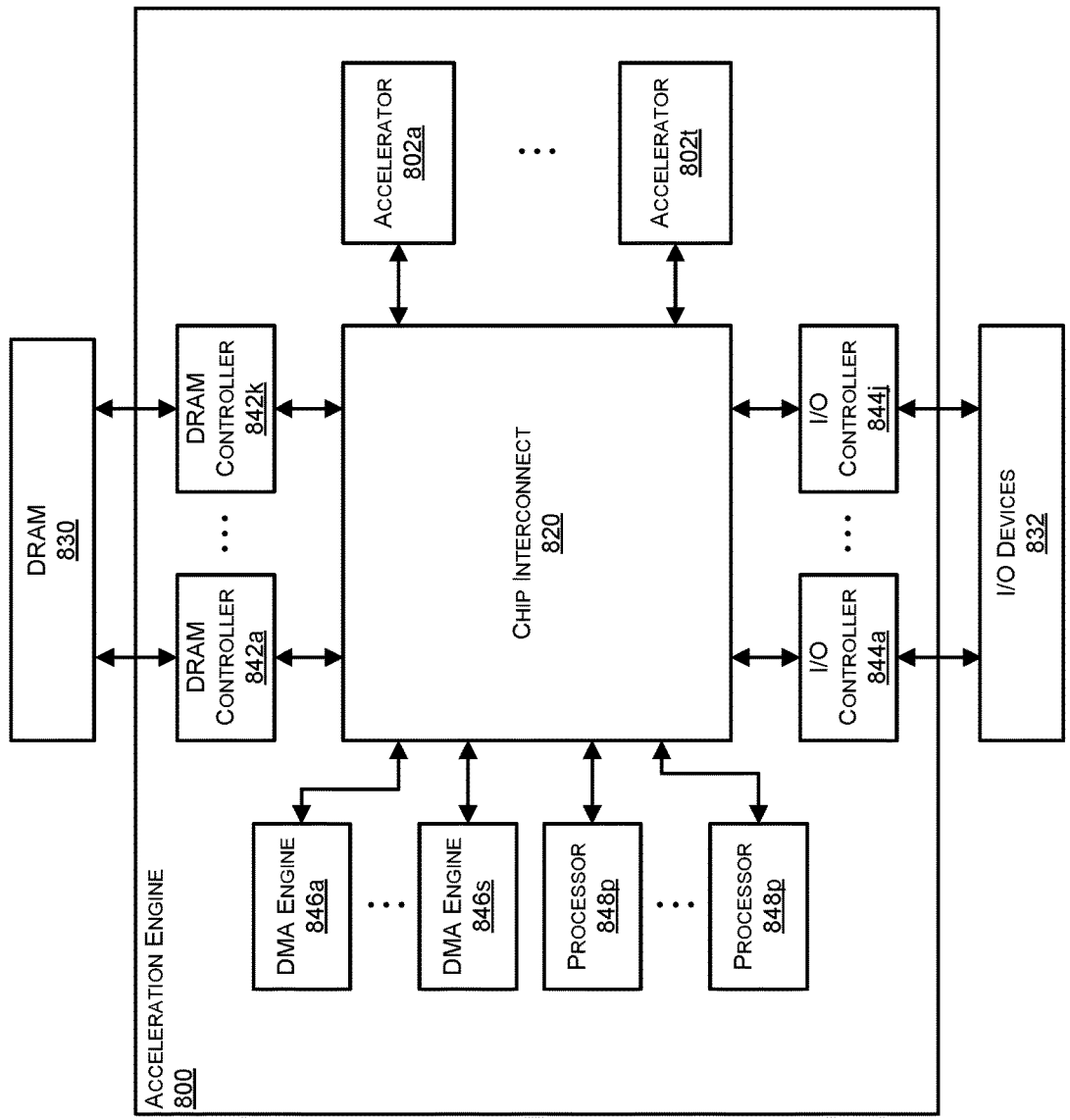
FIG. 8 includes a block diagram that illustrates an example of an acceleration engine.

FIG. 8 includes a block diagram that illustrates an example of an acceleration engine 800. The acceleration engine 800 is an example of an integrated circuit that can include one or more accelerators 802a-802t like the accelerator 702 illustrated in FIG. 7.

In the example of FIG. 8, the acceleration engine 800 includes multiple accelerators 802a-802t, each of which can perform a set of operations. In various examples, the accelerators 802a-802t are for particular types of operations, so that the accelerators 802a-802t can perform the operations much faster than when similar operations are performed by a general-purpose processor. In various examples, to perform a set of operations, input data on which the operations are to be performed must first be moved into the accelerators 802a-802t. Additionally, in some cases, program code is also moved into the accelerators 802a-802t, which programs the operations that the accelerators 802a-802t will perform on the data. In the illustrated example, the acceleration engine 800 includes t accelerators 802a-802t. Examples of accelerators that can be included in the acceleration engine 800 include graphics accelerators, floating point accelerators, neural network accelerators, and others. In various examples, the accelerators 802a-802t can each be the same (e.g., each of the accelerators 802a-802t is a graphics accelerator) or can be different (e.g., the accelerators 802a-802t include a graphics accelerator, a floating-point accelerator, and neural network accelerator).

The example acceleration engine 800 further includes DRAM controllers 842a-842k for communicating with an external memory. The external memory is implemented, in this example, using DRAM 830. In the illustrated example, the acceleration engine 800 includes k DRAM controllers 842a-842k, each of which may be able to communicate with an independent set of banks of DRAM. In other examples, other types of RAM technology can be used for the external memory. The DRAM controllers 842a-842k can also be referred to as memory controllers.

In various examples, input data and/or program code for the accelerators 802a-802t can be stored in the DRAM 830. Different programs can cause the accelerators 802a-802t to perform different operations. For example, when one of the accelerators is a neural network accelerator, one program can configure the neural network accelerator to perform speech recognition while another program can configure the neural network accelerator to perform image recognition. In various examples, different accelerators 802a-802t can be programmed with different programs, so that each performs a different set of operations. In various examples, the processors 848a-848p can manage moving of program code from the DRAM 830 to the accelerators 802a-802t.

The example acceleration engine 800 further includes I/O controllers 844a-844j for communicating with I/O devices 832 in the system. The acceleration engine 800 can communicate with I/O devices over, for example, a processor bus. In some examples, the processor bus can be implemented using Peripheral Component Interconnect (PCI) and/or a variation of the PCI bus protocol. The processor bus can connect the acceleration engine 800 to I/O devices such as, for example, input and output devices, memory controllers, storage devices, and/or network interface cards, among other things. In some examples, the I/O controllers 844-844*j* can enable the acceleration engine 800 to act as an I/O device for a host processor. For example, the acceleration engine 800 can be the recipient of input data from the host processor, and a command indicating an operation to be performed on the input data (e.g., a particular computation or analysis). In the illustrated example, the acceleration engine 800 includes j I/O controllers 844*a*-844*j*, each of which may include a separate root complex and may communicate with a separate set of I/O devices 832. In other examples, other standardized bus protocols, such as Ultra Path Interconnect (UPI) can be used for the host bus. In other examples, a proprietary bus protocol can be used.

Movement of data in the acceleration engine 800 can be managed by one or more processors 848*a*-848*p*, which can also be referred to as data management processors. In the example of FIG. 8, the acceleration engine 800 includes p processors 848*a*-848*p* incorporated into the device (e.g., on the same silicon die). In other examples, the processors 848*a*-848*p* can be external to the acceleration engine 800 (e.g., on a different die and/or in a different package). In some examples, the processors 848*a*-848*p* can manage the movement of data from I/O devices 832 to the accelerators 802*a*-802*t* or the DRAM 830. For example, input data may be located at an I/O device 832 or in processor memory, and the processors 848*a*-848*p* can move the input from the I/O device 832 or processor memory into an accelerator or into DRAM 830. As another example, program code for the accelerators 802*a*-802*t* may be located on an I/O device 832 or in processor memory.

The example acceleration engine 800 further includes DMA engines 846*a*-846*s* that can move data between the accelerators 802*a*-802*t*, DRAM controllers 842*a*-842*k*, and I/O controllers 844*a*-844*j*. In the illustrated example, the acceleration engine 800 includes s DMA engines 846*a*-846*s*. In certain embodiments, the DMA engines 846*a*-846*s* may include the DMAEngine1 740*a*-DMAEngineN 740*n* in FIG. 7. In certain examples, each accelerator from the accelerators 802*a*-802*t* may be supported by a respective set of DMA engines from the DMA engines 846*a*-846*s*. For example, the DMAEngine1 740*a*-DMAEngineN 740*n* in FIG. 7 may support the accelerator 802*a*.

In some implementations, the DMA engines 846*a*-846*s* can be assigned to specific tasks, such as moving data from the DRAM controllers 842*a*-842*k* to the accelerators 802*a*-802*t*, or moving data between the I/O controllers 844*a*-844*j* and the accelerators 802*a*-802*t*. These tasks can be assigned, for example, by enqueueing descriptors with the DMA engines 846*a*-846*s*, where a descriptor identifies an address for a block of data and an operation (e.g., a read or a write) to perform. A descriptor, for example, can direct a DMA engine to instruct a DMA controller to read a block of data from DRAM 830. A descriptor can, as a further example, instruct the DMA engine to write data, read by the DMA controller, to an accelerator. Further descriptors can be used to move data from an accelerator to DRAM 830. The descriptor may also provide information about the assigned semaphore for each DMA transfer. For example, the descriptors can be part of the TRIG instructions to trigger the N DMA transfers for each aggregate DMA transfer, as discussed with reference to FIGS. 4-6.

In various examples, each of the processors 848*a*-848*p* can be responsible for managing the data movement for a different accelerator. In some examples, a processor may manage the data movement for more than one accelerator. Similarly, in various examples, each of the processors 848*a*-848*p* can be assigned to one or more DMA engines 846*a*-846*s*. In these and other examples, associations between the processors 848*a*-848*p*, accelerators 802*a*-802*t*, and the DMA engines 846*a*-846*s* are determined by program code being executed by each respective processor.

In the example acceleration engine 800, the various components can communicate over a chip interconnect 820. The chip interconnect 820 primarily includes wiring for routing data between the components of the acceleration engine 800. In some cases, the chip interconnect 820 can include a minimal amount of logic, such as multiplexors to control the direction of data, flip-flops for handling clock domain crossings, and timing logic. In certain implementations, the acceleration engine 800 may also include the register file 730 which can be accessible using the chip interconnect 820. The register file 730 can be part of a larger register file or another component of the acceleration engine 800.

Figure 9:
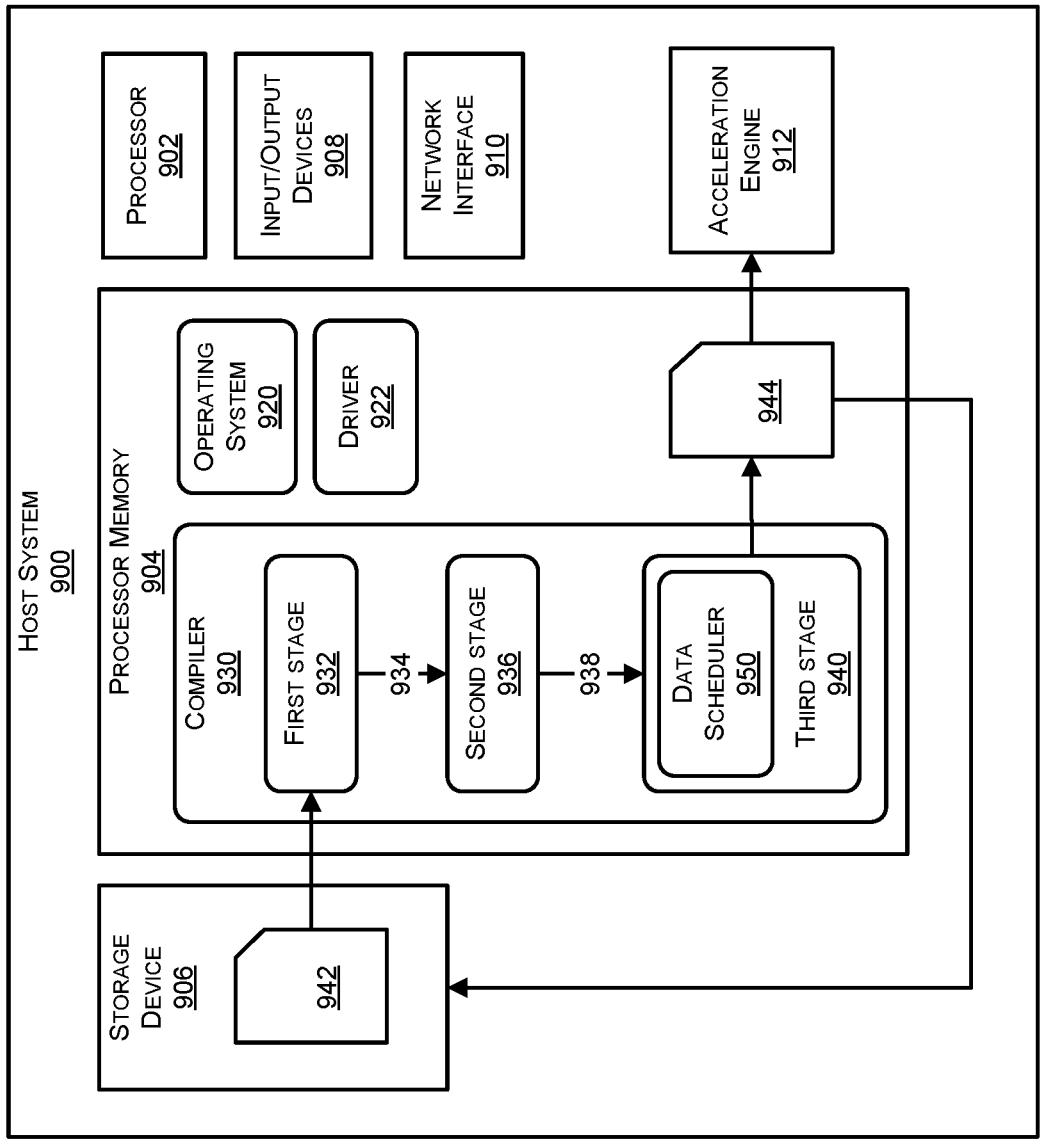
FIG. 9 includes a block diagram that illustrates an example of a host system.

FIG. 9 includes a block diagram illustrating an example of a host system 900 on which a compiler 930, such as is described herein, can run. The illustrated host system 900 is an example of a computing device, and includes a processor 902, a processor memory 904, at least one storage device 906, various Input/Output (I/O) devices 908, and at least one network interface 910. In the example of FIG. 9, the host system 900 also includes an acceleration engine 912, which is an integrated circuit device that can accelerate certain operations or computations performed by the host system 900. In various examples, the host system 900 can be implemented as a server in a data center, a desktop computer, a laptop computer, a tablet computer, or a smartphone, among other examples. In some examples, operations or components discussed below as being performed or included in the host system 900 can be performed or included in other computer devices. For example, the compiler 930 can execute on the host system 900 while the acceleration engine 912 is located at a different host system. In certain examples, the acceleration engine 912 can be the acceleration engine 800 described with reference to FIG. 8.

The processor 902 is an integrated circuit device that can execute program code, in the form of instructions. The program code can be for various software applications or tools, such as an operating system 920 or the illustrated compiler 930. While the processor 902 is executing a program, the instructions for the program can be stored in the processor memory 904. The instructions can also be stored elsewhere, such as on the storage device 906, and can be loaded into the processor memory 904 when needed by the processor 902. The processor 902 can also use the processor memory 904 for temporary storage of other data on which the processor 902 is operating. In various examples, the processor memory 904 is a volatile memory type, such as a type of Random-Access Memory, though non-volatile memory types can, alternatively or additionally, be used for the processor memory 904.

The storage device 906 is an example of a device that can include non-volatile memory. For example, the storage device 906 can be a magnetic disk drive, a solid-state drive, or an optical drive, among other examples. The storage device 906 can further be non-transitory, such that program code and other data stored on the storage device 906 remains present when the storage device 906 is not powered on.

The storage device 906 is one example of a peripheral device, which are components that can be coupled to the host system 900 to add functionality to the host system 900. Other examples of peripheral devices include the Input/Output devices 908 and the network interface 910. The Input/Output devices 908 can include user input and output devices, such as keyboards, mice, touch screens, microphones, display screens, speakers, printers, and scanners, among other examples. The network interface 910, which can be implemented using a network interface card, can provide access to one or more networks. The network interface 910 can include, for example, a physical port for connecting a network cable and/or wireless antennas for communicating with Wi-Fi and/or cellular networks. The network interface 910 can also be described as an I/O device.

The acceleration engine 912 is also another type of peripheral device or I/O device. The acceleration engine 912 is a device that is purpose-built to perform certain operations that can be performed by the processor 902, but can be performed faster by the acceleration engine 912. For example, the acceleration engine 912 can be a neural network accelerator, and, as such, may be able to perform the large scale, parallel computations of a neural network more efficiently than when the computations are performed by the processor 902. As another example, the acceleration engine 912 can be a graphics processing unit (GPU), and may be optimized to perform the computations needed for graphics rendering. Other examples of devices that can be implemented by the acceleration engine 912 include cryptographic accelerators, compression and decompression accelerators, 3-D accelerators, regular expression accelerators, security accelerators, and others.

In various examples, the acceleration engine 912 can execute program code to perform certain operations. For example, when the acceleration engine 912 is a neural network accelerator, the acceleration engine 912 can be programmed to execute a particular neural network, such as one that performs image recognition or one that performs machine translation. As a further example, to support the execution of a neural network, the acceleration engine 912 can be programed to perform operations such as copying data for the neural network from the processor memory 904 (for example) into the acceleration engine 912, copying input data for the neural network from the processor memory 904 into the acceleration engine 912, and/or copying results from the acceleration engine 912 into the processor memory 904, among other examples. The acceleration engine 912 can use the DMA engines 846a-846s to copy or move the data according to certain embodiments.

To generate program code for the acceleration engine 912, in various examples, the host system 900 can execute the compiler 930. Compilers, in general, are software programs that translate program code written in a human-readable language into a format (e.g., machine instructions) that can be read and processed by an integrated circuit device. In the example of FIG. 9, the acceleration engine 912 is a neural network accelerator and the compiler 930 is for compiling a neural network model into instructions to be executed by the acceleration engine 912. When the acceleration engine 912 implements a different type of accelerator, another compiler can be used.

The compiler 930 can be activated, for example, when the operating system 920 receives keyboard, mouse, touchscreen, voice commands, or other inputs from the Input/Output devices 908. The inputs can further include parameters for the compiler 930, such as the input code 942 to compile and configuration options for the compilation process. Once the compiler 930 is activated, the processor 902 can load the instructions for the compiler 930 into the processor memory 904, and can execute the instructions.

In the example of FIG. 9, the compiler 930 includes a first stage 932, a second stage 936, and a third stage 940, which each perform different operations to produce compiled code 944. In other examples, the compiler 930 can combine the operations of the first stage 932, second stage 936, and/or third stage 940 into fewer stages, or can divide the operations of one of the stages into multiple stages.

The first stage 932 can receive and process input code 942 for a neural network model. The input code 942 can describe a program in a high-level programming language, such as Java, C++, or TensorFlow, among many other examples. The input code 942 can describe, for example, steps to perform image recognition, speech recognition, machine translation, or other operations. The input code 942 can be obtained, for example, from the storage device 906. Alternatively, though not illustrated here, the input code 942 may be located in the processor memory 904 or can be obtained from a network location, using the network interface 910. Processing of the input code 942 can include sorting the operations described in the input code 942 into layers, where the outputs of one layer provide the inputs to a next layer. Processing can also include identifying steps to be performed by the processor 902, rather than by the acceleration engine 912. For example, the processor 902, through the execution of a driver 922, may need to perform steps such as configuring DMA descriptors for moving data into or out of the acceleration engine 912, among other examples. The processor 902 can also assign one or more semaphores from the M semaphores to each aggregate DMA transfer. The DMA descriptors may also include the address or location of the assigned semaphores.

The output 934 of the first stage 932 can be organized, for example, in the layers, nodes, and connections between nodes of a neural network. The second stage 936 can perform intermediate processing on this output 934. For example, the operations performed in any one layer, or at any one node in a layer, may be too many for the acceleration engine 912 to perform at the same time. The acceleration engine 912 may, for example, have a limited amount of locale storage space for the data needed for a computation, or the computations may be more than the acceleration engine 912 can perform at one time. In this example, the first stage 932 can break the operations of the layer or node down into smaller operations, which can fit into the acceleration engine's local memory and/or can fit into the computing capacity of the acceleration engine 912. Processing of the output 934 of the first stage 932 can include other steps, such as scheduling, or determining the order in which the acceleration engine 912 and/or processor 902 will perform operations, among other examples.

In various examples, the output 938 of the second stage 936 includes the various steps to be performed by components of the acceleration engine 912, in the order that the steps are to be performed. The output 938 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples. The data flow graph can be similar to the neural network graph 100 as described with reference to FIG. 1, which shows the nodes and the dependencies between the nodes.

The third stage 940 can operate on the output 938 of the second stage 936, and perform various steps before producing the instructions that are to be executed by the acceleration engine 912. These steps can include, for example, removing redundant dependencies, resolving or handling dependencies between nodes by inserting synchronization instructions into the code, identifying possibly optimizations in memory usage or memory bandwidth usage, and other operations. In some examples, the third stage 940 can include a data scheduler 950 to determine the order in which instructions are executed by the acceleration engine 912. For example, the data scheduler 950 can insert various operations to be executed by the pooling engine 402, the DMA engines 408a-408n, the PE array 404, and the activation engine 406 to perform DMA synchronization using one or more assigned semaphores per aggregate DMA transfer, according to certain embodiments.

In certain examples, the data scheduler 950 can estimate size of the DMA transfers and their time distribution for a plurality of aggregate DMA transfers, and assign the one or more semaphores from the M semaphores to each aggregate DMA transfer of the plurality of aggregate DMA transfers based on the estimation. For example, the data scheduler 950 can make an estimation based on the size and memory bandwidth of the memory subsystem 704, results buffer 712, PE array 404, Q1-QN in the DMA engines 408a-408n, or the DRAM 830, among others. Each aggregate DMA transfer may comprise N DMA transfers, where M is smaller than N. The data scheduler 950 can further assign, for each aggregate DMA transfer, one of the assigned semaphores to a respective DMA transfer of the N DMA transfers. For example, when the DMA transfers are almost equal in size and uniformly distributed in time, the data scheduler 950 can assign one of the M semaphores to each aggregate DMA transfer in a round-robin manner. If the size of the DMA transfers or their time distribution is not uniform, the data scheduler 950 can assign the M semaphores to the plurality of aggregate DMA transfers in another manner, e.g., as discussed with reference to FIG. 6. As described with reference to FIGS. 4-6, the data scheduler 950 may include the information about the assigned semaphore in each TRIG instruction for each DMA transfer. The data scheduler 950 can also insert different wait instructions for execution by the pooling engine 402, activation engine 406, or the PE array 404 for synchronization.

The output of the third stage 940 is compiled code 944, which may include machine instructions in binary format. In some examples, the compiled code 944 can be stored in the processor memory 904. Alternatively, or additionally, the compiled code 944 can be copied to the storage device 906 or to a network location. As noted above, the acceleration engine 912 may be located at a different host system, in which case the compiled code 944 can be sent over the network interface 910 to the other host system. For example, the compiled code 944 can be stored in the DRAM 830 in FIG. 8 for execution by the acceleration engine 800.

In the example of FIG. 9, the host system 900 can be executing a driver 922, which can also be referred to as a device driver or runtime driver, that manages the acceleration engine 912. The driver 922 can provide an interface between applications executing on the host system 900 (or on another host system) and the acceleration engine 912. For example, the driver 922 can provide an Application Program Interface (API) that defines functions for feeding input data to the acceleration engine 912 and defining the operation to perform on the input data. In this and other examples, the driver 922 can configure the acceleration engine 912 to perform the operation. For example, the driver 922 can identify a neural network that the acceleration engine 912 is to execute, as well as the location in the processor memory 904 or on the storage device 106 where the compiled code 944 for the neural network is located. The driver 922 can further load into the acceleration engine 912 or cause the acceleration engine 912 to load the compiled code 944, can load or cause the acceleration engine 912 to load the input data on which the neural network is to operate, and/or can cause the acceleration engine 912 to being executing on the input data. Once the acceleration engine 912 has finished, the acceleration engine 912 can notify the driver 922, and the driver 122 can deliver a result back to the application that requested the result.

FIG. 10 includes a flowchart 1000 illustrating a method which can be used to perform synchronization of DMA transfers on large number of DMA queues with a small number of semaphores, according to certain embodiments. The method can be implemented by a host system to generate compiled code using a compiler for execution by different components of an accelerator. For example, the host system 900 can use the compiler 930 to generate the compiled code 944 given an input data set, as discussed with reference to FIG. 9. The compiled code 944 can be executed by one or more of the accelerators 802a-802t in the acceleration engine 800 to perform the DMA synchronization for DMA transfers on the N DMA queues using the M semaphores.

At step 1002, the method may include receiving a neural network model that includes a plurality of aggregate DMA transfers. For example, the host system 900 may receive the input code 942 for a neural network model for a neural network. The input code 942 may include code to perform training or inference operations on the neural network model for tasks such as object detection, speech processing, search queries, or computer vision, among others. For example, the neural network model may include a plurality of aggregate DMA transfers to transfer large amounts of data. In certain implementations, transferring large amounts of data may require parallel transfers on multiple DMA queues, and therefore synchronization of the DMA transfers on multiple queues may need to be performed using a small number of semaphores, according to certain embodiments. Referring back to FIG. 4, the plurality of aggregate DMA transfers may include a first aggregate transfer including DMA transfer1 412_1-transfer1 412_N, a second aggregate transfer including DMA transfer2 414_1-transfer2 414_N, and a third aggregate transfer including DMA transfer3 416_1-transfer3 416_N and a fourth aggregate transfer including DMA transfer4 418_1-transfer4 418_N.

At step 1004, the method may further include generating, for each aggregate DMA transfer of the plurality of aggregate DMA transfers, instructions including triggering, by a first computational engine, the aggregate DMA transfer. The aggregate DMA transfer may be assigned to one or more semaphores from M semaphores, and may comprise N DMA transfers. Each DMA transfer of the N DMA transfers may be assigned to one of the assigned one or more semaphores from the M semaphores, where M is smaller than N. M and N can be positive integers. For example, M can be 3 and N can be 16. In certain embodiments, the first computational engine may be the pooling engine 402, which can perform trigger operations to trigger the plurality of aggregate DMA transfers including a first aggregate DMA transfer, a second aggregate DMA transfer, a third aggregate DMA transfer, a fourth aggregate DMA transfer, a fifth aggregate DMA transfer, and a sixth aggregate DMA transfer, sequentially, on 16 DMA engines 408a-408n. In a first example, as discussed with reference to FIG. 5, one of the semaphores S1, S2, or S3 can be assigned in a round-robin manner to each aggregate DMA transfer as shown in the table 500. In a second example, as discussed with reference to FIG. 6, two of the semaphores from S1, S2 and S3 can be assigned to each aggregate DMA transfer as shown in the table 600.

At step 1006, the method may further include generating instructions for performing, by each DMA engine of N DMA engines, a respective DMA transfer of the N DMA transfers. For example, the DMAEngine1 408a-DMAEngineN 408n may include 16 DMA engines, and each of the 16 DMA engines may perform a respective DMA transfer concurrently on a respective DMA queue.

At step 1008, the method may further include generating instructions for incrementing, by each DMA engine of the N DMA engines after performing the respective DMA transfer, a value of the assigned semaphore for the respective DMA transfer. Each DMA engine of the 16 DMA engines may increment a value of the assigned semaphore after performing the respective DMA transfer. As shown in FIG. 5, in the first example, the value of the assigned semaphore may be incremented by 16 after performing 16 DMA transfers for each aggregate DMA transfer. In the second example, for each aggregate DMA transfer, the value of S1 may be incremented by 10, and the value of S2 or S3 may be incremented by 6.

At step 1010, the method may further include generating instructions for performing, by a second computational engine after the one or more assigned semaphores for the aggregate DMA transfer reach respective threshold values, a respective operation. For example, the second computational engine may perform a first operation using a portion of data from a first aggregate DMA transfer. In the first example, for the first aggregate DMA transfer, the activation engine 406 may perform the ACT1 operation 106a after S1 reaches a threshold value of 16. Similarly, for the second aggregate DMA transfer, the PE array 404 may perform the MM2 operation 108a after S2 reaches a threshold value of 16, and for the third aggregate DMA transfer, the activation engine 406 may perform the ACT3 operation 106b after S3 reaches a threshold value of 16. In the second example, for the first aggregate DMA transfer, the activation engine 406 may perform the ACT1 operation 106a after S1 reaches a threshold value of 10 and S2 reaches a threshold value of 6. Similarly, for the second aggregate DMA transfer, the PE array 404 may perform the MM2 operation 108a after S1 reaches a threshold value of 20 and S3 reaches a threshold value of 6. As discussed previously, reaching a threshold value may imply that the semaphore value has become equal to or greater than the threshold value.

In certain embodiments, a subsequent aggregate DMA transfer of the plurality of aggregate DMA transfers can be assigned to the one or more semaphores of the M semaphores previously assigned to one or more aggregate DMA transfers, if the one or more semaphores have reached the respective threshold values for the previously assigned one or more aggregate DMA transfers. In the first example, as discussed with reference to FIG. 5, a fourth aggregate DMA transfer triggered by the TRIG4 operation 502_4 may be assigned to S1 again if S1 has reached the threshold value for the first aggregate DMA transfer triggered by the TRIG1 operation 502_1. The pooling engine 402 may execute the wait instruction 428 to determine if the semaphore S1 assigned to the first aggregated DMA transfer has reached a threshold value of 16. In the second example, as discussed with reference to FIG. 6, a third aggregate DMA transfer triggered by the TRIG3 operation 602_3 may be assigned to S1 and S2 again if S1 has reached a respective threshold value for the second aggregate DMA transfer triggered by the TRIG2 operation 602_2, and S2 has reached a respective threshold value for the first aggregate DMA transfer triggered by the TRIG1 operation 602_1. The pooling engine 402 may execute two wait instructions to determine if the semaphore S1 assigned to the second aggregate DMA transfer has reached a threshold value of 20, and if the semaphore S2 assigned to the first aggregate DMA transfer has reached a threshold value of 6.

Thus, certain embodiments can be used for synchronization of DMA transfers on large number of DMA queues with a small number of semaphores as compared to the number of DMA queues. The smaller number of semaphores can allow the waiting engines to execute fewer wait instructions concurrently, thus improving the system performance.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules. Any of the methods described herein can be implemented as a computer-readable medium or a computer program product comprising instructions which, when the program is executed by one or more computers, cause the one or more computers to carry out the steps of the method. Such computer program products can be transmitted, over a wired or wireless network, in a data carrier signal carrying the computer program product.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method for synchronization of direct memory access (DMA) transfers, comprising:
    receiving a neural network model that includes a plurality of aggregate direct memory access (DMA) transfers;
    assigning one of M semaphores to each aggregate DMA transfer of the plurality of aggregate DMA transfers in a round-robin manner; and
    generating, based on the neural network model, instructions for:
       triggering, by a first computational engine, a first aggregate DMA transfer from the plurality of aggregate DMA transfers assigned to a first semaphore from the M semaphores, the first aggregate DMA transfer comprising first N DMA transfers, wherein M is smaller than N;
       performing, by each DMA engine of N DMA engines, a respective DMA transfer of the first N DMA transfers for the first aggregate DMA transfer;
       incrementing, by each DMA engine of the N DMA engines after performing the respective DMA transfer of the first N DMA transfers for the first aggregate DMA transfer, a value of the first semaphore;
       performing, by a second computational engine after the value of the first semaphore reaches a first threshold value, a first operation;
       triggering, by the first computational engine, a second aggregate DMA transfer from the plurality of aggregate DMA transfers assigned to a second semaphore from the M semaphores, the second aggregate DMA transfer comprising second N DMA transfers;
       performing, by each DMA engine of the N DMA engines, a respective DMA transfer of the second N DMA transfers for the second aggregate DMA transfer;
       incrementing, by each DMA engine of the N DMA engines after performing the respective DMA transfer of the second N DMA transfers for the second aggregate DMA transfer, a value of the second semaphore; and
       performing, by a third computational engine after the value of the second semaphore reaches a second threshold value, a second operation.

2. The computer-implemented method of claim 1, further comprising generating additional instructions for:
    triggering, by the first computational engine, a third aggregate DMA transfer from the plurality of aggregate DMA transfers assigned to a third semaphore from the M semaphores, the third aggregate DMA transfer comprising third N DMA transfers;
    performing, by each DMA engine of the N DMA engines, a respective DMA transfer of the third N DMA transfers for the third aggregate DMA transfer;
    incrementing, by each DMA engine of the N DMA engines after performing the respective DMA transfer of the third N DMA transfers for the third aggregate DMA transfer, a value of the third semaphore; and
    performing, by the second computational engine after the value of the third semaphore reaches a third threshold value, a third operation.

3. The computer-implemented method of claim 2, further comprising generating additional instructions for:
    determining, by the first computational engine, whether the first semaphore has reached the first threshold value indicating completion of the first aggregate DMA transfer;
    triggering, by the first computational engine upon determining that the first semaphore has reached the first threshold value, a fourth aggregate DMA transfer from the plurality of aggregate DMA transfers assigned to the first semaphore, the first aggregate DMA transfer comprising fourth N DMA transfers;
    performing, by each DMA engine of the N DMA engines, a respective DMA transfer of the fourth N DMA transfers for the fourth aggregate DMA transfer;
    incrementing, by each DMA engine of the N DMA engines after performing the respective DMA transfer of the fourth N DMA transfers for the fourth aggregate DMA transfer, the value of the first semaphore; and
    performing, by the third computational engine after the value of the first semaphore reaches a fourth threshold value, a fourth operation.

4. The computer-implemented method of claim 3, further comprising:
    prior to generating the instructions, initializing each of the M semaphores to 0,
    wherein each of the first threshold value, the second threshold value, and the third threshold value is equal to N, and the fourth threshold value is equal to 2×N.

5. A computer-implemented method comprising:
    receiving a neural network model that includes a plurality of aggregate direct memory access (DMA) transfers; and
    generating, for each aggregate DMA transfer of the plurality of aggregate DMA transfers, instructions including:
       triggering, by a first computational engine, the aggregate DMA transfer, the aggregate DMA transfer assigned to one or more semaphores from M semaphores and comprising N DMA transfers, wherein each DMA transfer of the N DMA transfers is assigned to one of the assigned one or more semaphores from the M semaphores, and wherein M is smaller than N;

performing, by each DMA engine of N DMA engines, a respective DMA transfer of the N DMA transfers;

incrementing, by each DMA engine of the N DMA engines after performing the respective DMA transfer, a value of the assigned semaphore for the respective DMA transfer; and performing, by a second computational engine after the one or more assigned semaphores for the aggregate DMA transfer reach respective threshold values, a respective operation.

6. The computer-implemented method of claim 5, wherein a subsequent aggregate DMA transfer of the plurality of aggregate DMA transfers is assigned to the one or more semaphores of the M semaphores previously assigned to one or more aggregate DMA transfers, if the one or more semaphores have reached the respective threshold values for the previously assigned one or more aggregate DMA transfers.

7. The computer-implemented method of claim 5, wherein the second computational engine performs a first operation using a portion of data from a first aggregate DMA transfer from the plurality of aggregate DMA transfers.

8. The computer-implemented method of claim 5, wherein each aggregate DMA transfer is assigned to one of the M semaphores in a round-robin manner.

9. The computer-implemented method of claim 8, further comprising:

prior to generating the instructions, initializing each semaphore from the M semaphores to 0, wherein a first semaphore from the M semaphores is assigned to a first aggregate DMA transfer of the plurality of aggregate DMA transfers, and a second semaphore from the M semaphores is assigned to a second aggregate DMA transfer of the plurality of aggregate DMA transfers that is subsequent to the first aggregate DMA transfer, and wherein the second computational engine performs a first operation after the first semaphore reaches a first threshold value of N for the first aggregate DMA transfer.

10. The computer-implemented method of claim 9, the instructions further including:

performing, by a third computational engine after the one or more assigned semaphores for the aggregate DMA transfer reach the respective threshold values, another operation, wherein the third computational engine performs a second operation after the second semaphore reaches a second threshold value of N.

11. The computer-implemented method of claim 9, wherein the first semaphore is assigned to a third aggregate DMA transfer of the plurality of aggregate DMA transfers that is subsequent to the second aggregate DMA transfer if the first semaphore has reached the first threshold value of N for the first aggregate DMA transfer, and wherein the second computational engine performs a second operation after the first semaphore reaches a second threshold value of 2×N for the third aggregate DMA transfer.

12. The computer-implemented method of claim 5, further comprising:

prior to generating the instructions, performing an estimation of size and time-distribution for each DMA transfer of the N DMA transfers for each aggregate DMA transfer of the plurality of aggregate DMA transfers; and assigning, based on the estimation, the one or more semaphores from the M semaphores to each aggregate DMA transfer of the plurality of aggregate DMA transfers.

13. The computer-implemented method of claim 12, wherein the M semaphores comprise a first semaphore, a second semaphore, and a third semaphore, and wherein, for each aggregate DMA transfer of the plurality of aggregate DMA transfers, a portion of the N DMA transfers are assigned to the first semaphore, and remaining DMA transfers of the N DMA transfers are assigned to the second semaphore or the third semaphore alternatively in a round-robin manner.

14. The computer-implemented method of claim 5, wherein each DMA transfer of the N DMA transfers is performed using a queue from N queues in the N DMA engines, respectively.

15. The computer-implemented method of claim 5, wherein each semaphore of the M semaphores is a register of size 16-bits or 32-bits.

16. A non-transitory computer readable medium having stored therein instructions that, when executed by one or more processors, cause the one or more processors to execute a compiler, the compiler performing operations including:

receiving a neural network model that includes a plurality of aggregate direct memory access (DMA) transfers; and generating, for each aggregate DMA transfer of the plurality of aggregate DMA transfers, instructions including:

triggering, by a first computational engine, the aggregate DMA transfer, the aggregate DMA transfer assigned to one or more semaphores from M semaphores and comprising N DMA transfers, wherein each DMA transfer of the N DMA transfers is assigned to one of the assigned one or more semaphores from the M semaphores, and wherein M is smaller than N;

performing, by each DMA engine of N DMA engines, a respective DMA transfer of the N DMA transfers;

incrementing, by each DMA engine of the N DMA engines after performing the respective DMA transfer, a value of the assigned semaphore for the respective DMA transfer; and performing, by a second computational engine after the one or more assigned semaphores for the aggregate DMA transfer reach respective threshold values, a respective operation.

17. The non-transitory computer readable medium of claim 16, the operations further including:

prior to generating the instructions, performing an estimation of size and time-distribution for each DMA transfer of the N DMA transfers for each aggregate DMA transfer of the plurality of aggregate DMA transfers; and assigning, based on the estimation, the one or more semaphores from the M semaphores to each aggregate DMA transfer of the plurality of aggregate DMA transfers.

18. The non-transitory computer readable medium of claim 16, the instructions further including:

performing, by a third computational engine after the one or more assigned semaphores for the aggregate DMA transfer reach respective threshold values, another operation.

19. The non-transitory computer readable medium of claim 18, wherein the first computational engine is a pooling engine, the second computational engine is an activation engine, and the third computational engine is a processing engine (PE) array in a neural network processor.

20. The non-transitory computer readable medium of claim 19, wherein the compiler is executed on a first host system, and the neural network processor is part of another host system.

\* \* \* \* \*